US008133016B2

(12) United States Patent
McGovern et al.

(10) Patent No.: US 8,133,016 B2

(45) Date of Patent: Mar. 13, 2012

(54) AIRFOIL PROFILE FOR A SECOND STAGE TURBINE NOZZLE

(75) Inventors: Kevin T. McGovern, Simpsonville, SC (US); Bruce Smith, Greer, SC (US); Leissner F. Poth, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 12/348,037

(22) Filed: Jan. 2, 2009

(65) Prior Publication Data

US 2010/0172752 A1 Jul. 8, 2010

(51) Int. Cl.

| | |
|---|---|
| ***F03D 11/00*** | (2006.01) |
| ***F03D 1/04*** | (2006.01) |
| ***F03D 3/04*** | (2006.01) |
| ***F01D 1/02*** | (2006.01) |
| ***F03B 1/04*** | (2006.01) |
| ***F03B 3/16*** | (2006.01) |
| ***F04D 29/44*** | (2006.01) |
| ***F04D 29/54*** | (2006.01) |

(52) U.S. Cl. .................................... 415/191; 415/211.2

(58) Field of Classification Search .................. 415/191, 415/211.2, 208.1

See application file for complete search history.

(56) References Cited

U.S. PATENT DOCUMENTS

| | | | | |
|---|---|---|---|---|
| 6,503,054 | B1 * | 1/2003 | Bielek et al. | 415/191 |
| 6,832,897 | B2 | 12/2004 | Urban | |
| 6,866,477 | B2 | 3/2005 | Arness et al. | |
| 6,887,041 | B2 | 5/2005 | Coke et al. | |
| 6,910,868 | B2 | 6/2005 | Hyde et al. | |
| 7,001,147 | B1 | 2/2006 | Phillips et al. | |
| 7,329,092 | B2 | 2/2008 | Keener et al. | |
| 7,329,093 | B2 | 2/2008 | Vandeputte et al. | |

* cited by examiner

*Primary Examiner* — Chuong A Luu
*Assistant Examiner* — Nga Doan
(74) *Attorney, Agent, or Firm* — Nixon & Vanderhye P.C.

(57) ABSTRACT

Second-stage nozzles have vanes including airfoil profiles substantially in accordance with Cartesian coordinate values of X, Y and Z set forth in inches in Table I with the X, Y and Z values commencing at the radially innermost aerodynamic section of the airfoil and then made relative to that section for the Z coordinate values. The X, Y and Z values may be scaled as a function of the same constant or number to provide a scaled-up or scaled-down airfoil section for the nozzle.

10 Claims, 6 Drawing Sheets

AIRFOIL PROFILE FOR A SECOND STAGE TURBINE NOZZLE

FIELD OF THE INVENTION

The present invention relates to a turbine nozzle for a gas turbine stage, and in particular to a second-stage turbine vane airfoil profile.

BACKGROUND OF THE INVENTION

In recent years, advanced gas turbines have trended toward increasing firing temperatures and efforts to improve cooling of the various turbine components. In a particular gas turbine design of the assignee, a high output turbine that uses air cooling is undergoing development. It will be appreciated that the design and construction of the turbine buckets and nozzles require optimized aerodynamic efficiency, as well as aerodynamic and mechanical loading.

BRIEF DESCRIPTION OF THE INVENTION

According to one embodiment of the invention, a turbine nozzle has a nozzle vane in the shape of an airfoil in an envelope within ±0.100 inches in a direction normal to any airfoil surface location. The airfoil has an uncoated nominal profile substantially in accordance with Cartesian coordinate values of X, Y and Z set forth in inches in Table I, set forth below, with the X, Y and Z values commencing at a radially innermost aerodynamic section of the airfoil and then made relative to that section for the Z coordinate values, the profiles at the Z distances being joined smoothly with one another to form the complete airfoil shape.

According to another embodiment of the invention, a turbine nozzle has a nozzle vane in the shape of an airfoil having an uncoated nominal airfoil profile substantially in accordance with Cartesian coordinate values of X, Y and Z set forth in inches in Table I with the X, Y and Z values commencing at a radially innermost aerodynamic section of the airfoil and then made relative to that section for the Z coordinate values. The profiles at the Z distances are joined smoothly with one another to form the complete airfoil profile. The X, Y and Z values are scaled as a function of the same constant or number to provide a scaled-up or scaled-down vane airfoil.

According to still another embodiment of the invention, a turbine comprises a turbine nozzle having a plurality of vanes, each of said vanes being in the shape of an airfoil in an envelope within ±0.100 inches in a direction normal to any vane airfoil surface location. The airfoil has an uncoated nominal profile substantially in accordance with Cartesian coordinate values of X, Y and Z set forth in inches in Table I with the X, Y and Z values commencing at a radially innermost aerodynamic section of the airfoil and then made relative to that section for the Z coordinate values. The profiles at the Z distances are joined smoothly with one another to form the complete airfoil shape.

According to a further embodiment of the invention, a turbine comprises a turbine nozzle having a plurality of vanes, each of said vanes being in the shape of an airfoil having an uncoated nominal airfoil profile substantially in accordance with Cartesian coordinate values of X, Y and Z set forth in inches in Table I with the X, Y and Z values commencing at the radially innermost aerodynamic section of the airfoil and then made relative to that section for the Z coordinate values. The profiles at the Z distances are joined smoothly with one another to form the complete airfoil shape. The X, Y and Z values are scaled as a function of the same constant or number to provide a scaled-up or scaled-down vane airfoil.

DETAILED DESCRIPTION OF THE INVENTION

Figure 1:
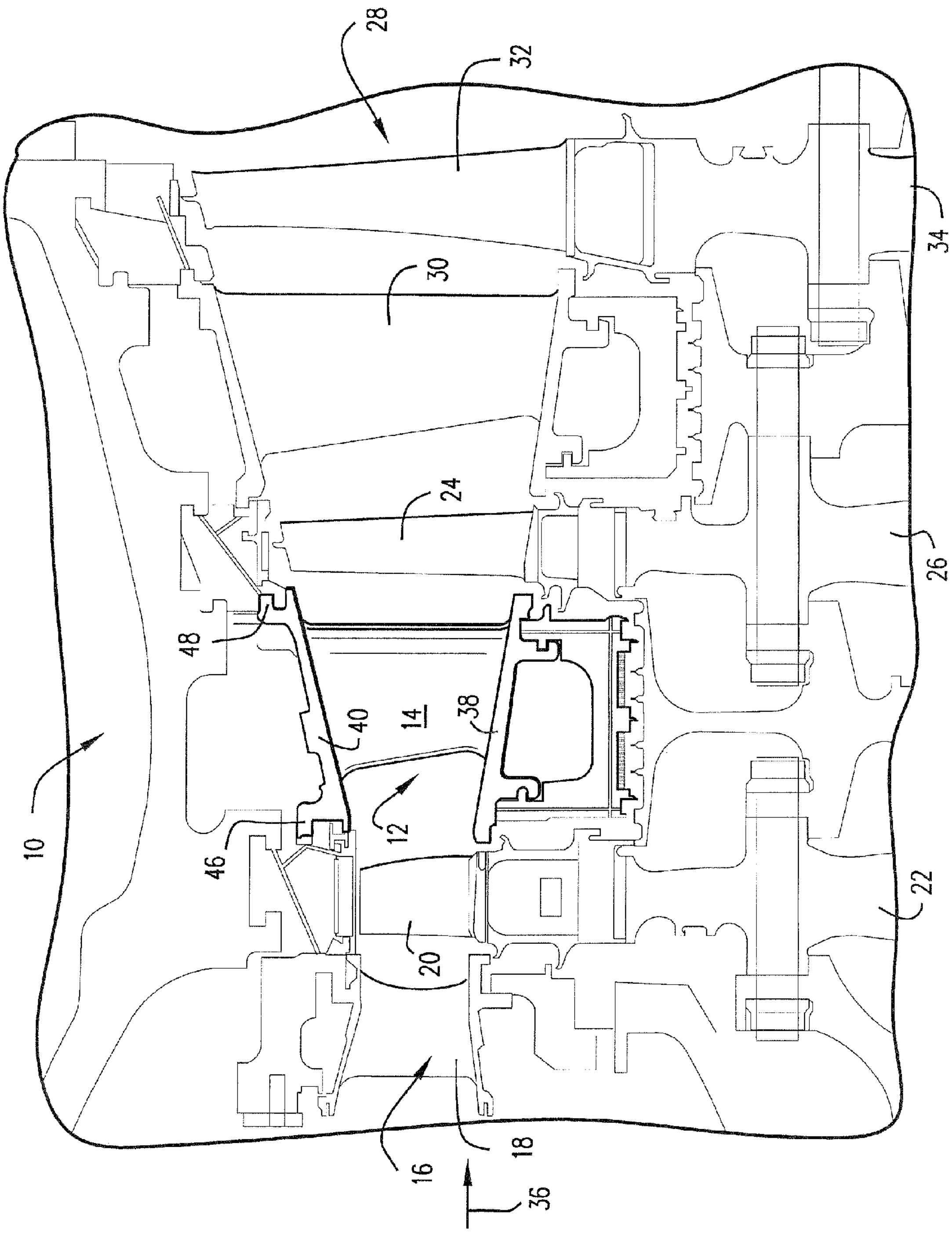
FIG. 1 is a schematic illustration of a turbine having a second-stage nozzle employing the airfoil or vane profile hereof.

Referring now to FIG. 1, there is illustrated a portion of a turbine 10 having a second-stage nozzle 12. The nozzle 12 includes a plurality of vanes 14 having an airfoil shape or profile spaced circumferentially one from the other. The turbine 10 may include three stages, a first stage 16 having a plurality of circumferentially spaced nozzle vanes 18 and buckets 20 circumferentially spaced about a rotatable turbine wheel 22; the second stage nozzle 12 comprising a plurality of circumferentially spaced nozzle vanes 14 and a plurality of circumferentially spaced buckets 24 mounted on a second-stage wheel 26; and a third-stage 28 mounting nozzle vanes 30 and a plurality of circumferentially spaced buckets 32 mounted on a third-stage wheel 34.

The nozzle vanes and buckets lie in the hot gas path of the turbine and gases flow through the turbine in the direction of the arrow 36. As illustrated, the nozzle vanes 14 of the second stage 12 are disposed between inner and outer bands 38 and 40, respectively, by which the nozzles form an annulus about the rotor axis.

Figure 2:
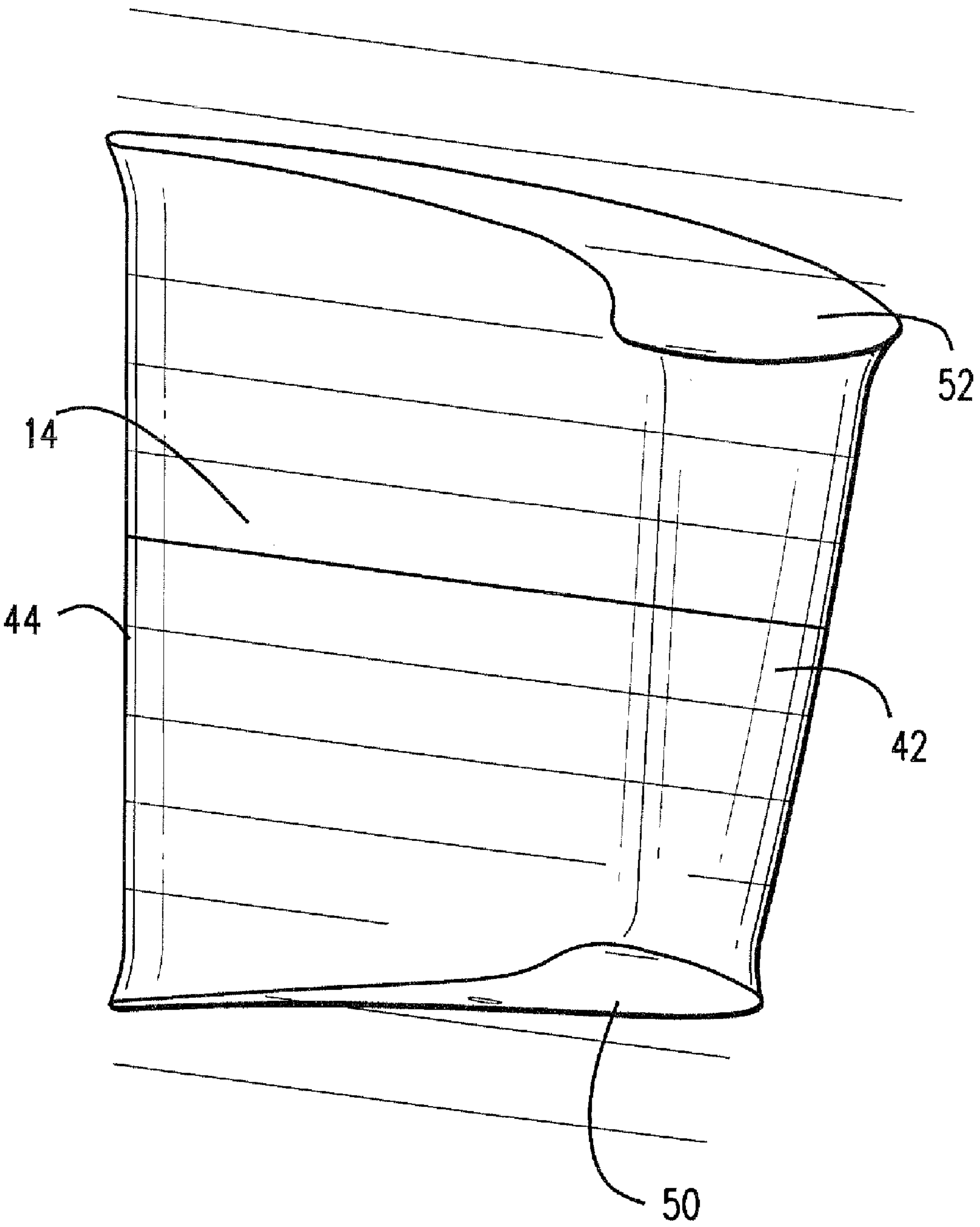
FIG. 2 is a perspective view of a nozzle vane thereof.

Referring to FIG. 2, the nozzle vanes 14 have leading and trailing edges 42 and 44, respectively, with hooks 46 and 48 for securing the nozzle vane segments to the non-rotatable casing of the turbine. As will be appreciated, the nozzle vanes have various passages therethrough for flowing a cooling medium through the vanes. In the embodiment of the second-stage nozzle for this particular turbine, there are forty-eight nozzle vanes forming the second stage.

Referring again to FIG. 2, the nozzle vanes 14 for the second-stage have airfoil profiles defined by a Cartesian coordinate system for X, Y and Z values. The coordinate values are set forth in inches in Table I. The Cartesian coordinate system has orthogonally-related X, Y and Z axes with the X, Y and Z values commencing at a radially innermost aerodynamic section 50 of the airfoil and then made relative to that section for the Z coordinate. By defining X and Y coordinate values at selected locations in a Z direction, the profile of airfoil 14 can be ascertained. By connecting the X and Y values with smooth, continuing arcs, each profile section at each distance Z is fixed. The surface profiles at the various surface locations between the distances Z are connected smoothly to one another to form the airfoil. The tabular values given in Table I below are in inches and represent airfoil profiles at ambient, non-operating, or non-hot, conditions and are for an uncoated airfoil. The sign convention assigns a positive value to the value Z and positive and negative values for the X and Y coordinate values, as typically used in a Cartesian coordinate system.

The Table I values are generated and shown to four decimal places for determining the profiles of the airfoil. Where the values are carried out to less than four decimal places, zeros are added to the right to complete the value to four decimal places. Further, there are typical manufacturing tolerances as well as coatings which must be accounted for in the actual profile of the airfoil. Therefore, the values for the profile given in Table I are for a nominal airfoil. It will therefore be appreciated that typical manufacturing tolerances, i.e., plus or minus values and coating thicknesses, are additive to the X and Y values given in Table I below. Accordingly, a distance of ±0.100 inches in a direction normal to any surface location along the airfoil profile defines an airfoil profile envelope for this particular nozzle vane design and turbine. In one embodiment, the nozzle vane profiles given in Table I below are for the second stage of the turbine. Forty-eight nozzle vanes having such profiles are equally spaced from one another about the rotor axis and thus comprise the second stage.

The coordinate values given in Table I below in inches provide the preferred nominal profile envelope.

TABLE I

| X Coordinate | Y Coordinate | Z Coordinate |
|---|---|---|
| 0.2720 | −1.3370 | 10.0000 |
| 0.4555 | −1.4600 | 10.0000 |
| 0.6372 | −1.5855 | 10.0000 |
| 0.8172 | −1.7136 | 10.0000 |
| 0.3124 | −0.7183 | 10.0000 |
| 0.5202 | −0.7933 | 10.0000 |
| 0.7275 | −0.8693 | 10.0000 |
| 0.9344 | −0.9466 | 10.0000 |
| 1.1408 | −1.0253 | 10.0000 |
| 1.3466 | −1.1056 | 10.0000 |
| 1.5517 | −1.1876 | 10.0000 |
| 1.7560 | −1.2714 | 10.0000 |
| 1.9595 | −1.3573 | 10.0000 |
| 2.1620 | −1.4455 | 10.0000 |
| 2.3633 | −1.5363 | 10.0000 |
| −1.5681 | −0.0740 | 10.0000 |
| −1.3587 | −0.1442 | 10.0000 |
| −1.8676 | −0.1227 | 10.0000 |
| −1.8817 | −0.0931 | 10.0000 |
| −1.8420 | −0.1433 | 10.0000 |
| −1.8811 | −0.0603 | 10.0000 |
| −1.8667 | −0.0308 | 10.0000 |
| −1.8416 | −0.0097 | 10.0000 |
| −1.8101 | −0.0002 | 10.0000 |
| −1.7775 | −0.0039 | 10.0000 |
| 0.0869 | −1.2166 | 10.0000 |
| −1.1493 | −0.2145 | 10.0000 |
| −0.9400 | −0.2851 | 10.0000 |
| −0.7308 | −0.3559 | 10.0000 |
| −0.5217 | −0.4272 | 10.0000 |
| −0.3128 | −0.4990 | 10.0000 |
| −0.1042 | −0.5713 | 10.0000 |
| 0.1043 | −0.6444 | 10.0000 |
| −1.6438 | −0.2408 | 10.0000 |
| −1.4466 | −0.3403 | 10.0000 |
| −1.2505 | −0.4418 | 10.0000 |
| −1.0554 | −0.5454 | 10.0000 |
| −0.8616 | −0.6513 | 10.0000 |
| −0.6690 | −0.7595 | 10.0000 |
| −0.4779 | −0.8701 | 10.0000 |
| −0.2881 | −0.9831 | 10.0000 |
| −0.0998 | −1.0986 | 10.0000 |
| 2.5635 | −1.6297 | 10.0000 |
| 2.4900 | −3.1512 | 10.0000 |
| 2.7622 | −1.7262 | 10.0000 |
| 3.1962 | −3.9990 | 10.0000 |
| 2.9593 | −1.8258 | 10.0000 |
| 2.3357 | −2.9931 | 10.0000 |

TABLE I-continued

| X Coordinate | Y Coordinate | Z Coordinate |
|---|---|---|
| 3.1547 | −1.9287 | 10.0000 |
| 2.6404 | −3.3129 | 10.0000 |
| 3.3482 | −2.0353 | 10.0000 |
| 2.9283 | −3.6479 | 10.0000 |
| 3.5394 | −2.1457 | 10.0000 |
| 0.9953 | −1.8442 | 10.0000 |
| 3.7283 | −2.2603 | 10.0000 |
| 1.1713 | −1.9776 | 10.0000 |
| 3.9143 | −2.3793 | 10.0000 |
| 1.3452 | −2.1138 | 10.0000 |
| 4.0974 | −2.5029 | 10.0000 |
| 4.2771 | −2.6313 | 10.0000 |
| 1.5169 | −2.2528 | 10.0000 |
| 4.4532 | −2.7646 | 10.0000 |
| 1.6861 | −2.3946 | 10.0000 |
| 1.8529 | −2.5395 | 10.0000 |
| 4.6252 | −2.9031 | 10.0000 |
| 2.0169 | −2.6874 | 10.0000 |
| 4.7929 | −3.0468 | 10.0000 |
| 4.9559 | −3.1959 | 10.0000 |
| 5.1138 | −3.3503 | 10.0000 |
| 5.2661 | −3.5102 | 10.0000 |
| 5.4126 | −3.6755 | 10.0000 |
| 2.7866 | −3.4785 | 10.0000 |
| 2.1780 | −2.8386 | 10.0000 |
| 3.0650 | −3.8214 | 10.0000 |
| 6.3971 | −5.3878 | 10.0000 |
| 6.0432 | −4.5798 | 10.0000 |
| 6.4586 | −5.5999 | 10.0000 |
| 6.1461 | −4.7753 | 10.0000 |
| 4.2250 | −6.4193 | 10.0000 |
| 4.0639 | −5.7767 | 10.0000 |
| 6.2399 | −4.9752 | 10.0000 |
| 3.9979 | −5.5660 | 10.0000 |
| 4.2705 | −6.6354 | 10.0000 |
| 3.3216 | −4.1809 | 10.0000 |
| 3.4405 | −4.3670 | 10.0000 |
| 3.5525 | −4.5573 | 10.0000 |
| 3.6572 | −4.7518 | 10.0000 |
| 3.8434 | −5.1522 | 10.0000 |
| 3.7542 | −4.9502 | 10.0000 |
| 3.9245 | −5.3576 | 10.0000 |
| 6.5073 | −5.8153 | 10.0000 |
| 6.5624 | −6.4743 | 10.0000 |
| 4.1231 | −5.9895 | 10.0000 |
| 6.5606 | −6.2535 | 10.0000 |
| 5.5528 | −3.8461 | 10.0000 |
| 5.6864 | −4.0220 | 10.0000 |
| 6.5418 | −6.0334 | 10.0000 |
| 5.8130 | −4.2030 | 10.0000 |
| 4.1764 | −6.2038 | 10.0000 |
| 6.3238 | −5.1795 | 10.0000 |
| 5.9321 | −4.3890 | 10.0000 |
| 5.2209 | −8.2174 | 10.0000 |
| 5.4403 | −8.2094 | 10.0000 |
| 5.6480 | −8.1358 | 10.0000 |
| 5.8366 | −8.0213 | 10.0000 |
| 6.0037 | −7.8772 | 10.0000 |
| 6.1490 | −7.7111 | 10.0000 |
| 6.2721 | −7.5279 | 10.0000 |
| 6.3731 | −7.3316 | 10.0000 |
| 4.3151 | −6.8517 | 10.0000 |
| 6.4519 | −7.1254 | 10.0000 |
| 4.4146 | −7.2821 | 10.0000 |
| 4.4777 | −7.4937 | 10.0000 |
| 6.5092 | −6.9122 | 10.0000 |
| 4.5587 | −7.6990 | 10.0000 |
| 6.5457 | −6.6944 | 10.0000 |
| 4.6685 | −7.8904 | 10.0000 |
| 4.8175 | −8.0525 | 10.0000 |
| 4.3620 | −7.0676 | 10.0000 |
| 5.0071 | −8.1641 | 10.0000 |
| 2.2550 | −1.4170 | 9.0000 |
| 2.4522 | −1.5057 | 9.0000 |
| −1.6020 | −0.0040 | 9.0000 |
| −1.3970 | −0.0730 | 9.0000 |
| −1.7056 | −0.0943 | 9.0000 |
| −1.7054 | −0.0613 | 9.0000 |

TABLE I-continued

| X Coordinate | Y Coordinate | Z Coordinate |
|---|---|---|
| −1.6913 | −0.0315 | 9.0000 |
| −1.6663 | −0.0100 | 9.0000 |
| −1.6347 | −0.0002 | 9.0000 |
| 1.0530 | −0.9286 | 9.0000 |
| 1.2550 | −1.0057 | 9.0000 |
| 1.4565 | −1.0843 | 9.0000 |
| 1.6573 | −1.1646 | 9.0000 |
| 1.8574 | −1.2466 | 9.0000 |
| 0.9427 | −1.6738 | 9.0000 |
| 2.0567 | −1.3307 | 9.0000 |
| 0.7670 | −1.5476 | 9.0000 |
| 0.5893 | −1.4243 | 9.0000 |
| 0.4098 | −1.3038 | 9.0000 |
| 0.2284 | −1.1860 | 9.0000 |
| −1.1920 | −0.1420 | 9.0000 |
| 0.0453 | −1.0709 | 9.0000 |
| −0.9871 | −0.2110 | 9.0000 |
| −0.1395 | −0.9585 | 9.0000 |
| −0.7822 | −0.2802 | 9.0000 |
| −0.3258 | −0.8487 | 9.0000 |
| −0.5774 | −0.3497 | 9.0000 |
| −0.5136 | −0.7415 | 9.0000 |
| −0.3727 | −0.4196 | 9.0000 |
| −0.7029 | −0.6368 | 9.0000 |
| −0.1682 | −0.4899 | 9.0000 |
| −0.8934 | −0.5345 | 9.0000 |
| −1.6913 | −0.1240 | 9.0000 |
| 0.0361 | −0.5608 | 9.0000 |
| −1.0850 | −0.4342 | 9.0000 |
| 0.2402 | −0.6324 | 9.0000 |
| −1.2777 | −0.3360 | 9.0000 |
| 0.4440 | −0.7049 | 9.0000 |
| −1.4712 | −0.2395 | 9.0000 |
| 0.6474 | −0.7783 | 9.0000 |
| −1.6655 | −0.1446 | 9.0000 |
| 0.8504 | −0.8528 | 9.0000 |
| 1.6230 | −2.2078 | 9.0000 |
| 4.9957 | −3.1231 | 9.0000 |
| 1.4565 | −2.0698 | 9.0000 |
| 5.1502 | −3.2744 | 9.0000 |
| 1.2875 | −1.9348 | 9.0000 |
| 5.2988 | −3.4315 | 9.0000 |
| 1.1162 | −1.8028 | 9.0000 |
| 5.4411 | −3.5944 | 9.0000 |
| 2.6483 | −1.5970 | 9.0000 |
| 2.8430 | −1.6911 | 9.0000 |
| 3.2303 | −3.9515 | 9.0000 |
| 3.0362 | −1.7882 | 9.0000 |
| 3.1065 | −3.7742 | 9.0000 |
| 3.2278 | −1.8885 | 9.0000 |
| 2.9772 | −3.6008 | 9.0000 |
| 3.4176 | −1.9923 | 9.0000 |
| 2.8428 | −3.4314 | 9.0000 |
| 3.6052 | −2.0998 | 9.0000 |
| 2.7036 | −3.2659 | 9.0000 |
| 3.7905 | −2.2113 | 9.0000 |
| 2.5601 | −3.1041 | 9.0000 |
| 3.9732 | −2.3270 | 9.0000 |
| 2.4124 | −2.9461 | 9.0000 |
| 4.1530 | −2.4473 | 9.0000 |
| 2.2611 | −2.7916 | 9.0000 |
| 4.3295 | −2.5722 | 9.0000 |
| 2.1062 | −2.6407 | 9.0000 |
| 4.5024 | −2.7021 | 9.0000 |
| 1.9480 | −2.4932 | 9.0000 |
| 4.6714 | −2.8371 | 9.0000 |
| 1.7869 | −2.3489 | 9.0000 |
| 4.8360 | −2.9773 | 9.0000 |
| 4.0859 | −5.9243 | 9.0000 |
| 4.0324 | −5.7148 | 9.0000 |
| 3.9727 | −5.5070 | 9.0000 |
| 3.9060 | −5.3012 | 9.0000 |
| 3.8319 | −5.0981 | 9.0000 |
| 5.5766 | −3.7629 | 9.0000 |
| 3.7502 | −4.8979 | 9.0000 |
| 5.7046 | −3.9372 | 9.0000 |
| 3.6607 | −4.7010 | 9.0000 |
| 5.8247 | −4.1171 | 9.0000 |

TABLE I-continued

| X Coordinate | Y Coordinate | Z Coordinate |
|---|---|---|
| 3.5637 | −4.5077 | 9.0000 |
| 5.9362 | −4.3023 | 9.0000 |
| 3.4593 | −4.3183 | 9.0000 |
| 6.0388 | −4.4927 | 9.0000 |
| 3.3480 | −4.1329 | 9.0000 |
| 6.1318 | −4.6879 | 9.0000 |
| 6.2147 | −4.8877 | 9.0000 |
| 6.2868 | −5.0915 | 9.0000 |
| 6.3477 | −5.2990 | 9.0000 |
| 6.3966 | −5.5097 | 9.0000 |
| 6.4328 | −5.7228 | 9.0000 |
| 6.4555 | −5.9379 | 9.0000 |
| 6.4636 | −6.1539 | 9.0000 |
| 4.2201 | −6.5591 | 9.0000 |
| 6.4564 | −6.3700 | 9.0000 |
| 4.1784 | −6.3469 | 9.0000 |
| 4.1341 | −6.1352 | 9.0000 |
| 6.3329 | −7.0053 | 9.0000 |
| 6.2548 | −7.2068 | 9.0000 |
| 6.1569 | −7.3995 | 9.0000 |
| 6.0387 | −7.5806 | 9.0000 |
| 5.8998 | −7.7461 | 9.0000 |
| 5.7400 | −7.8916 | 9.0000 |
| 5.5591 | −8.0096 | 9.0000 |
| 5.3585 | −8.0891 | 9.0000 |
| 5.1442 | −8.1082 | 9.0000 |
| 4.9347 | −8.0575 | 9.0000 |
| 4.7490 | −7.9483 | 9.0000 |
| 4.6032 | −7.7894 | 9.0000 |
| 4.4958 | −7.6021 | 9.0000 |
| 4.4170 | −7.4008 | 9.0000 |
| 4.3561 | −7.1934 | 9.0000 |
| 4.3059 | −6.9830 | 9.0000 |
| 4.2616 | −6.7713 | 9.0000 |
| 6.4328 | −6.5850 | 9.0000 |
| 6.3920 | −6.7973 | 9.0000 |
| −1.4594 | −0.0003 | 8.0000 |
| −1.4910 | −0.0102 | 8.0000 |
| −0.4305 | −0.3414 | 8.0000 |
| −0.3663 | −0.7214 | 8.0000 |
| −0.2315 | −0.4095 | 8.0000 |
| −0.5508 | −0.6205 | 8.0000 |
| −0.0326 | −0.4779 | 8.0000 |
| −1.5149 | −0.1251 | 8.0000 |
| −0.7365 | −0.5219 | 8.0000 |
| 0.1661 | −0.5469 | 8.0000 |
| −1.5295 | −0.0954 | 8.0000 |
| −0.9234 | −0.4253 | 8.0000 |
| 0.3645 | −0.6166 | 8.0000 |
| −1.5296 | −0.0623 | 8.0000 |
| −1.1111 | −0.3305 | 8.0000 |
| 0.5627 | −0.6870 | 8.0000 |
| −1.5159 | −0.0321 | 8.0000 |
| −1.2997 | −0.2374 | 8.0000 |
| 0.7605 | −0.7583 | 8.0000 |
| −1.4890 | −0.1457 | 8.0000 |
| 0.9580 | −0.8307 | 8.0000 |
| 1.1551 | −0.9041 | 8.0000 |
| 1.3517 | −0.9789 | 8.0000 |
| 1.5477 | −1.0551 | 8.0000 |
| 1.7432 | −1.1327 | 8.0000 |
| 1.9379 | −1.2121 | 8.0000 |
| 2.1319 | −1.2933 | 8.0000 |
| 0.8815 | −1.5015 | 8.0000 |
| 2.3251 | −1.3766 | 8.0000 |
| 0.7086 | −1.3817 | 8.0000 |
| −1.4265 | −0.0040 | 8.0000 |
| 0.5338 | −1.2647 | 8.0000 |
| −1.2273 | −0.0715 | 8.0000 |
| 0.3571 | −1.1507 | 8.0000 |
| −1.0280 | −0.1388 | 8.0000 |
| 0.1787 | −1.0394 | 8.0000 |
| −0.8288 | −0.2062 | 8.0000 |
| −0.0014 | −0.9308 | 8.0000 |
| −0.6296 | −0.2737 | 8.0000 |
| −0.1831 | −0.8248 | 8.0000 |
| 3.0129 | −3.5154 | 8.0000 |
| 3.4587 | −1.9299 | 8.0000 |

TABLE I-continued

| X Coordinate | Y Coordinate | Z Coordinate |
|---|---|---|
| 2.8849 | −3.3485 | 8.0000 |
| 3.6421 | −2.0329 | 8.0000 |
| 2.7520 | −3.1855 | 8.0000 |
| 3.8232 | −2.1398 | 8.0000 |
| 2.6147 | −3.0262 | 8.0000 |
| 4.0020 | −2.2507 | 8.0000 |
| 2.4731 | −2.8707 | 8.0000 |
| 4.1779 | −2.3658 | 8.0000 |
| 2.3277 | −2.7188 | 8.0000 |
| 4.3509 | −2.4855 | 8.0000 |
| 2.1786 | −2.5705 | 8.0000 |
| 4.5204 | −2.6099 | 8.0000 |
| 2.0261 | −2.4256 | 8.0000 |
| 4.6863 | −2.7392 | 8.0000 |
| 1.8706 | −2.2840 | 8.0000 |
| 4.8480 | −2.8736 | 8.0000 |
| 1.7121 | −2.1458 | 8.0000 |
| 5.0051 | −3.0135 | 8.0000 |
| 1.5509 | −2.0107 | 8.0000 |
| 5.1568 | −3.1591 | 8.0000 |
| 1.3871 | −1.8788 | 8.0000 |
| 5.3027 | −3.3106 | 8.0000 |
| 1.2208 | −1.7500 | 8.0000 |
| 5.4421 | −3.4681 | 8.0000 |
| 1.0523 | −1.6242 | 8.0000 |
| 5.5744 | −3.6315 | 8.0000 |
| 2.5172 | −1.4621 | 8.0000 |
| 2.7082 | −1.5501 | 8.0000 |
| 2.8981 | −1.6407 | 8.0000 |
| 3.2531 | −3.8606 | 8.0000 |
| 3.0865 | −1.7340 | 8.0000 |
| 3.1358 | −3.6861 | 8.0000 |
| 3.2735 | −1.8304 | 8.0000 |
| 6.3005 | −5.1344 | 8.0000 |
| 6.3401 | −5.3409 | 8.0000 |
| 6.3664 | −5.5495 | 8.0000 |
| 6.3791 | −5.7594 | 8.0000 |
| 6.3778 | −5.9697 | 8.0000 |
| 4.1843 | −6.4098 | 8.0000 |
| 6.3619 | −6.1794 | 8.0000 |
| 4.1445 | −6.2032 | 8.0000 |
| 4.1026 | −5.9971 | 8.0000 |
| 4.0571 | −5.7918 | 8.0000 |
| 4.0070 | −5.5876 | 8.0000 |
| 3.9510 | −5.3848 | 8.0000 |
| 3.8886 | −5.1840 | 8.0000 |
| 3.8194 | −4.9854 | 8.0000 |
| 3.7428 | −4.7895 | 8.0000 |
| 5.6991 | −3.8009 | 8.0000 |
| 3.6589 | −4.5967 | 8.0000 |
| 5.8154 | −3.9761 | 8.0000 |
| 3.5677 | −4.4072 | 8.0000 |
| 5.9228 | −4.1569 | 8.0000 |
| 3.4695 | −4.2212 | 8.0000 |
| 6.0204 | −4.3432 | 8.0000 |
| 3.3645 | −4.0390 | 8.0000 |
| 6.1076 | −4.5345 | 8.0000 |
| 6.1837 | −4.7306 | 8.0000 |
| 6.2482 | −4.9307 | 8.0000 |
| 4.4527 | −7.4240 | 8.0000 |
| 4.3759 | −7.2283 | 8.0000 |
| 4.3164 | −7.0266 | 8.0000 |
| 4.2675 | −6.8221 | 8.0000 |
| 4.2245 | −6.6162 | 8.0000 |
| 6.3311 | −6.3874 | 8.0000 |
| 6.2849 | −6.5925 | 8.0000 |
| 6.2226 | −6.7933 | 8.0000 |
| 6.1439 | −6.9883 | 8.0000 |
| 6.0483 | −7.1755 | 8.0000 |
| 5.9349 | −7.3526 | 8.0000 |
| 5.8032 | −7.5164 | 8.0000 |
| 5.6523 | −7.6626 | 8.0000 |
| 5.4814 | −7.7848 | 8.0000 |
| 5.2905 | −7.8722 | 8.0000 |
| 5.0839 | −7.9068 | 8.0000 |
| 4.8787 | −7.8673 | 8.0000 |
| 4.6980 | −7.7614 | 8.0000 |
| 4.5566 | −7.6065 | 8.0000 |

TABLE I-continued

| X Coordinate | Y Coordinate | Z Coordinate |
|---|---|---|
| 2.0200 | −1.1783 | 7.0000 |
| 2.2090 | −1.2563 | 7.0000 |
| 0.9935 | −1.4627 | 7.0000 |
| 2.3971 | −1.3363 | 7.0000 |
| 0.8252 | −1.3466 | 7.0000 |
| 0.6550 | −1.2333 | 7.0000 |
| 0.4830 | −1.1227 | 7.0000 |
| −0.8639 | −0.1357 | 7.0000 |
| 0.3094 | −1.0147 | 7.0000 |
| −0.6703 | −0.2016 | 7.0000 |
| 0.1342 | −0.9092 | 7.0000 |
| −0.4768 | −0.2676 | 7.0000 |
| −0.0424 | −0.8063 | 7.0000 |
| −0.2833 | −0.3337 | 7.0000 |
| −0.2205 | −0.7058 | 7.0000 |
| −0.0900 | −0.4002 | 7.0000 |
| −0.3999 | −0.6077 | 7.0000 |
| 0.1033 | −0.4670 | 7.0000 |
| −0.5804 | −0.5117 | 7.0000 |
| 0.2964 | −0.5342 | 7.0000 |
| −0.7620 | −0.4178 | 7.0000 |
| 0.4893 | −0.6020 | 7.0000 |
| −0.9446 | −0.3257 | 7.0000 |
| 0.6819 | −0.6705 | 7.0000 |
| 0.8743 | −0.7398 | 7.0000 |
| 1.0664 | −0.8099 | 7.0000 |
| 1.2581 | −0.8811 | 7.0000 |
| 1.4493 | −0.9534 | 7.0000 |
| 1.6401 | −1.0269 | 7.0000 |
| 1.8303 | −1.1018 | 7.0000 |
| 1.1599 | −1.5815 | 7.0000 |
| 5.5808 | −3.4939 | 7.0000 |
| 2.5844 | −1.4183 | 7.0000 |
| 2.7708 | −1.5025 | 7.0000 |
| 2.9560 | −1.5892 | 7.0000 |
| 3.3015 | −3.7527 | 7.0000 |
| 3.1399 | −1.6784 | 7.0000 |
| 3.1882 | −3.5826 | 7.0000 |
| 3.3225 | −1.7704 | 7.0000 |
| 3.0692 | −3.4163 | 7.0000 |
| 3.5036 | −1.8653 | 7.0000 |
| 2.9450 | −3.2538 | 7.0000 |
| 3.6830 | −1.9635 | 7.0000 |
| 2.8159 | −3.0953 | 7.0000 |
| 3.8603 | −2.0653 | 7.0000 |
| 2.6824 | −2.9405 | 7.0000 |
| 4.0353 | −2.1710 | 7.0000 |
| 2.5446 | −2.7894 | 7.0000 |
| 4.2078 | −2.2808 | 7.0000 |
| 2.4029 | −2.6420 | 7.0000 |
| 4.3775 | −2.3949 | 7.0000 |
| 2.2577 | −2.4981 | 7.0000 |
| 4.5439 | −2.5136 | 7.0000 |
| 2.1091 | −2.3576 | 7.0000 |
| 4.7068 | −2.6372 | 7.0000 |
| 1.9575 | −2.2204 | 7.0000 |
| 4.8658 | −2.7658 | 7.0000 |
| 1.8030 | −2.0865 | 7.0000 |
| 5.0202 | −2.8998 | 7.0000 |
| 1.6459 | −1.9557 | 7.0000 |
| 5.1695 | −3.0394 | 7.0000 |
| 1.4862 | −1.8280 | 7.0000 |
| 5.3132 | −3.1849 | 7.0000 |
| 1.3242 | −1.7033 | 7.0000 |
| 5.4505 | −3.3364 | 7.0000 |
| −1.3405 | −0.0327 | 7.0000 |
| −1.2510 | −0.0040 | 7.0000 |
| −1.3539 | −0.0631 | 7.0000 |
| −1.0575 | −0.0699 | 7.0000 |
| −1.3533 | −0.0964 | 7.0000 |
| −1.3158 | −0.0104 | 7.0000 |
| −1.3384 | −0.1261 | 7.0000 |
| −1.2841 | −0.0002 | 7.0000 |
| −1.1281 | −0.2354 | 7.0000 |
| −1.3123 | −0.1467 | 7.0000 |
| 3.8427 | −4.8507 | 7.0000 |
| 3.7704 | −4.6594 | 7.0000 |
| 5.7033 | −3.6576 | 7.0000 |

TABLE I-continued

| X Coordinate | Y Coordinate | Z Coordinate |
|---|---|---|
| 3.6907 | −4.4712 | 7.0000 |
| 5.8173 | −3.8273 | 7.0000 |
| 3.6037 | −4.2861 | 7.0000 |
| 5.9219 | −4.0030 | 7.0000 |
| 3.5097 | −4.1046 | 7.0000 |
| 6.0164 | −4.1843 | 7.0000 |
| 3.4088 | −3.9268 | 7.0000 |
| 6.0999 | −4.3708 | 7.0000 |
| 6.1717 | −4.5623 | 7.0000 |
| 6.2310 | −4.7579 | 7.0000 |
| 6.2774 | −4.9570 | 7.0000 |
| 6.3103 | −5.1588 | 7.0000 |
| 6.3294 | −5.3623 | 7.0000 |
| 6.3343 | −5.5667 | 7.0000 |
| 4.2139 | −6.4415 | 7.0000 |
| 6.3250 | −5.7709 | 7.0000 |
| 4.1779 | −6.2402 | 7.0000 |
| 6.3014 | −5.9739 | 7.0000 |
| 4.1422 | −6.0389 | 7.0000 |
| 6.2635 | −6.1748 | 7.0000 |
| 4.1046 | −5.8379 | 7.0000 |
| 4.0634 | −5.6376 | 7.0000 |
| 4.0175 | −5.4384 | 7.0000 |
| 3.9659 | −5.2405 | 7.0000 |
| 3.9078 | −5.0445 | 7.0000 |
| 5.7263 | −7.2638 | 7.0000 |
| 5.5818 | −7.4083 | 7.0000 |
| 5.4196 | −7.5324 | 7.0000 |
| 5.2387 | −7.6269 | 7.0000 |
| 5.0409 | −7.6758 | 7.0000 |
| 4.8386 | −7.6562 | 7.0000 |
| 4.6602 | −7.5589 | 7.0000 |
| 4.5225 | −7.4087 | 7.0000 |
| 4.4236 | −7.2301 | 7.0000 |
| 4.3515 | −7.0388 | 7.0000 |
| 4.2968 | −6.8418 | 7.0000 |
| 4.2525 | −6.6422 | 7.0000 |
| 6.2111 | −6.3724 | 7.0000 |
| 6.1440 | −6.5655 | 7.0000 |
| 6.0623 | −6.7529 | 7.0000 |
| 5.9657 | −6.9330 | 7.0000 |
| 5.8539 | −7.1042 | 7.0000 |
| 0.9948 | −0.7222 | 6.0000 |
| 1.1820 | −0.7903 | 6.0000 |
| 1.3688 | −0.8594 | 6.0000 |
| 1.5554 | −0.9294 | 6.0000 |
| 1.7414 | −1.0006 | 6.0000 |
| 1.9271 | −1.0730 | 6.0000 |
| 2.1121 | −1.1467 | 6.0000 |
| 2.2966 | −1.2219 | 6.0000 |
| 0.9495 | −1.3123 | 6.0000 |
| 2.6321 | −2.7096 | 6.0000 |
| 4.2530 | −2.2033 | 6.0000 |
| 2.4932 | −2.5668 | 6.0000 |
| 4.4198 | −2.3122 | 6.0000 |
| 2.3508 | −2.4275 | 6.0000 |
| 4.5837 | −2.4256 | 6.0000 |
| 2.2053 | −2.2914 | 6.0000 |
| 4.7441 | −2.5437 | 6.0000 |
| 2.0567 | −2.1586 | 6.0000 |
| 4.9008 | −2.6667 | 6.0000 |
| 1.9055 | −2.0290 | 6.0000 |
| 5.0531 | −2.7951 | 6.0000 |
| 1.7517 | −1.9023 | 6.0000 |
| 5.2006 | −2.9290 | 6.0000 |
| 1.5955 | −1.7787 | 6.0000 |
| 5.3425 | −3.0688 | 6.0000 |
| 1.4371 | −1.6579 | 6.0000 |
| 5.4783 | −3.2146 | 6.0000 |
| 1.2765 | −1.5400 | 6.0000 |
| 5.6071 | −3.3666 | 6.0000 |
| 1.1139 | −1.4248 | 6.0000 |
| 2.4804 | −1.2988 | 6.0000 |
| 2.6634 | −1.3776 | 6.0000 |
| 2.8454 | −1.4585 | 6.0000 |
| 3.0265 | −1.5416 | 6.0000 |
| 3.3750 | −3.6439 | 6.0000 |
| 3.2064 | −1.6272 | 6.0000 |

TABLE I-continued

| X Coordinate | Y Coordinate | Z Coordinate |
|---|---|---|
| 3.2637 | −3.4787 | 6.0000 |
| 3.3851 | −1.7153 | 6.0000 |
| 3.1469 | −3.3173 | 6.0000 |
| 3.5624 | −1.8062 | 6.0000 |
| 3.0250 | −3.1598 | 6.0000 |
| 3.7380 | −1.9002 | 6.0000 |
| 2.8983 | −3.0061 | 6.0000 |
| 3.9118 | −1.9976 | 6.0000 |
| 2.7672 | −2.8560 | 6.0000 |
| 4.0836 | −2.0985 | 6.0000 |
| −0.7769 | −0.3209 | 6.0000 |
| −0.9558 | −0.2333 | 6.0000 |
| −1.1356 | −0.1474 | 6.0000 |
| −1.1088 | −0.0002 | 6.0000 |
| −1.1406 | −0.0105 | 6.0000 |
| −1.1652 | −0.0331 | 6.0000 |
| −1.0757 | −0.0040 | 6.0000 |
| −1.1782 | −0.0638 | 6.0000 |
| −0.8871 | −0.0684 | 6.0000 |
| −1.1771 | −0.0972 | 6.0000 |
| −0.6986 | −0.1328 | 6.0000 |
| −1.1619 | −0.1269 | 6.0000 |
| −0.5101 | −0.1972 | 6.0000 |
| −0.3216 | −0.2617 | 6.0000 |
| 0.6195 | −0.5882 | 6.0000 |
| 0.8073 | −0.6548 | 6.0000 |
| 0.7833 | −1.2024 | 6.0000 |
| 0.6155 | −1.0951 | 6.0000 |
| 0.4460 | −0.9903 | 6.0000 |
| 0.2751 | −0.8879 | 6.0000 |
| 0.1028 | −0.7879 | 6.0000 |
| −0.1331 | −0.3263 | 6.0000 |
| −0.0708 | −0.6903 | 6.0000 |
| 0.0552 | −0.3912 | 6.0000 |
| −0.2457 | −0.5948 | 6.0000 |
| 0.2435 | −0.4565 | 6.0000 |
| −0.4217 | −0.5015 | 6.0000 |
| 0.4316 | −0.5221 | 6.0000 |
| −0.5988 | −0.4102 | 6.0000 |
| 4.2450 | −6.2664 | 6.0000 |
| 6.3233 | −5.5820 | 6.0000 |
| 4.2154 | −6.0694 | 6.0000 |
| 6.2952 | −5.7792 | 6.0000 |
| 4.1852 | −5.8725 | 6.0000 |
| 6.2525 | −5.9737 | 6.0000 |
| 4.1522 | −5.6760 | 6.0000 |
| 6.1953 | −6.1645 | 6.0000 |
| 4.1150 | −5.4803 | 6.0000 |
| 4.0725 | −5.2857 | 6.0000 |
| 4.0237 | −5.0925 | 6.0000 |
| 3.9680 | −4.9013 | 6.0000 |
| 3.9051 | −4.7122 | 6.0000 |
| 3.8348 | −4.5258 | 6.0000 |
| 5.7282 | −3.5247 | 6.0000 |
| 3.7569 | −4.3425 | 6.0000 |
| 5.8409 | −3.6890 | 6.0000 |
| 3.6717 | −4.1624 | 6.0000 |
| 5.9441 | −3.8593 | 6.0000 |
| 3.5794 | −3.9859 | 6.0000 |
| 6.0372 | −4.0355 | 6.0000 |
| 3.4804 | −3.8130 | 6.0000 |
| 6.1191 | −4.2170 | 6.0000 |
| 6.1891 | −4.4035 | 6.0000 |
| 6.2462 | −4.5943 | 6.0000 |
| 6.2901 | −4.7886 | 6.0000 |
| 6.3201 | −4.9855 | 6.0000 |
| 6.3358 | −5.1841 | 6.0000 |
| 6.3369 | −5.3833 | 6.0000 |
| 6.1238 | −6.3504 | 6.0000 |
| 6.0382 | −6.5302 | 6.0000 |
| 5.9385 | −6.7027 | 6.0000 |
| 5.8247 | −6.8662 | 6.0000 |
| 5.6970 | −7.0189 | 6.0000 |
| 5.5548 | −7.1584 | 6.0000 |
| 5.3979 | −7.2810 | 6.0000 |
| 5.2250 | −7.3794 | 6.0000 |
| 5.0362 | −7.4417 | 6.0000 |
| 4.8387 | −7.4392 | 6.0000 |

TABLE I-continued

| X Coordinate | Y Coordinate | Z Coordinate |
|---|---|---|
| 4.6587 | −7.3558 | 6.0000 |
| 4.5185 | −7.2156 | 6.0000 |
| 4.4231 | −7.0412 | 6.0000 |
| 4.3586 | −6.8529 | 6.0000 |
| 4.3123 | −6.6591 | 6.0000 |
| 4.2761 | −6.4632 | 6.0000 |
| 3.1060 | −1.4952 | 5.0000 |
| 3.4658 | −3.5312 | 5.0000 |
| 3.2821 | −1.5774 | 5.0000 |
| 3.3560 | −3.3708 | 5.0000 |
| 3.4571 | −1.6620 | 5.0000 |
| 3.2408 | −3.2143 | 5.0000 |
| 3.6309 | −1.7492 | 5.0000 |
| 3.1206 | −3.0615 | 5.0000 |
| 3.8031 | −1.8394 | 5.0000 |
| 2.9957 | −2.9126 | 5.0000 |
| 3.9736 | −1.9327 | 5.0000 |
| 4.1422 | −2.0294 | 5.0000 |
| 4.3087 | −2.1298 | 5.0000 |
| 4.4727 | −2.2342 | 5.0000 |
| 4.6338 | −2.3429 | 5.0000 |
| 4.7919 | −2.4561 | 5.0000 |
| 4.9463 | −2.5741 | 5.0000 |
| 5.0967 | −2.6973 | 5.0000 |
| 5.2423 | −2.8260 | 5.0000 |
| 5.3827 | −2.9605 | 5.0000 |
| 5.5171 | −3.1009 | 5.0000 |
| 5.6447 | −3.2475 | 5.0000 |
| −0.9898 | −0.0335 | 5.0000 |
| −0.7164 | −0.0669 | 5.0000 |
| −0.9654 | −0.0107 | 5.0000 |
| −0.5324 | −0.1297 | 5.0000 |
| −0.3485 | −0.1925 | 5.0000 |
| −0.9336 | −0.0003 | 5.0000 |
| −0.7829 | −0.2307 | 5.0000 |
| −0.9587 | −0.1477 | 5.0000 |
| −0.9853 | −0.1274 | 5.0000 |
| −1.0009 | −0.0978 | 5.0000 |
| −1.0024 | −0.0644 | 5.0000 |
| −0.9004 | −0.0040 | 5.0000 |
| 0.7538 | −1.0650 | 5.0000 |
| 0.5880 | −0.9635 | 5.0000 |
| 0.4208 | −0.8645 | 5.0000 |
| −0.1646 | −0.2554 | 5.0000 |
| 0.2522 | −0.7676 | 5.0000 |
| 0.0193 | −0.3185 | 5.0000 |
| 0.0824 | −0.6730 | 5.0000 |
| 0.2031 | −0.3818 | 5.0000 |
| −0.0886 | −0.5806 | 5.0000 |
| 0.3868 | −0.4453 | 5.0000 |
| −0.2607 | −0.4902 | 5.0000 |
| 0.5704 | −0.5092 | 5.0000 |
| −0.4338 | −0.4018 | 5.0000 |
| 0.7539 | −0.5735 | 5.0000 |
| −0.6079 | −0.3153 | 5.0000 |
| 0.9371 | −0.6383 | 5.0000 |
| 1.1202 | −0.7038 | 5.0000 |
| 1.3030 | −0.7699 | 5.0000 |
| 1.4855 | −0.8368 | 5.0000 |
| 1.6677 | −0.9047 | 5.0000 |
| 1.8494 | −0.9735 | 5.0000 |
| 2.0308 | −1.0435 | 5.0000 |
| 2.2117 | −1.1147 | 5.0000 |
| 1.0810 | −1.2751 | 5.0000 |
| 0.9182 | −1.1688 | 5.0000 |
| 2.9288 | −1.4152 | 5.0000 |
| 2.4567 | −2.3526 | 5.0000 |
| 2.3135 | −2.2212 | 5.0000 |
| 2.1674 | −2.0929 | 5.0000 |
| 2.0188 | −1.9676 | 5.0000 |
| 1.8677 | −1.8453 | 5.0000 |
| 1.7144 | −1.7258 | 5.0000 |
| 1.5589 | −1.6091 | 5.0000 |
| 1.4015 | −1.4951 | 5.0000 |
| 2.3920 | −1.1873 | 5.0000 |
| 1.2421 | −1.3838 | 5.0000 |
| 2.5717 | −1.2615 | 5.0000 |
| 2.7507 | −1.3374 | 5.0000 |

TABLE I-continued

| X Coordinate | Y Coordinate | Z Coordinate |
|---|---|---|
| 2.8666 | −2.7673 | 5.0000 |
| 2.7335 | −2.6256 | 5.0000 |
| 2.5968 | −2.4874 | 5.0000 |
| 5.9786 | −3.7248 | 5.0000 |
| 6.0706 | −3.8960 | 5.0000 |
| 6.1514 | −4.0728 | 5.0000 |
| 6.2199 | −4.2547 | 5.0000 |
| 6.2752 | −4.4410 | 5.0000 |
| 6.3169 | −4.6308 | 5.0000 |
| 6.3444 | −4.8232 | 5.0000 |
| 6.3572 | −5.0171 | 5.0000 |
| 4.3040 | −6.2880 | 5.0000 |
| 6.3548 | −5.2115 | 5.0000 |
| 4.2820 | −6.0949 | 5.0000 |
| 6.3376 | −5.4050 | 5.0000 |
| 4.2607 | −5.9017 | 5.0000 |
| 6.3055 | −5.5967 | 5.0000 |
| 4.2378 | −5.7086 | 5.0000 |
| 6.2586 | −5.7853 | 5.0000 |
| 4.2115 | −5.5160 | 5.0000 |
| 6.1973 | −5.9697 | 5.0000 |
| 4.1798 | −5.3242 | 5.0000 |
| 4.1420 | −5.1336 | 5.0000 |
| 4.0974 | −4.9444 | 5.0000 |
| 4.0451 | −4.7572 | 5.0000 |
| 3.9851 | −4.5723 | 5.0000 |
| 5.7647 | −3.4004 | 5.0000 |
| 5.8763 | −3.5595 | 5.0000 |
| 5.0391 | −7.2053 | 5.0000 |
| 4.8467 | −7.2236 | 5.0000 |
| 4.6680 | −7.1514 | 5.0000 |
| 4.5220 | −7.0250 | 5.0000 |
| 4.4263 | −6.8566 | 5.0000 |
| 4.3681 | −6.6713 | 5.0000 |
| 4.3307 | −6.4806 | 5.0000 |
| 6.1218 | −6.1488 | 5.0000 |
| 6.0324 | −6.3214 | 5.0000 |
| 5.9295 | −6.4862 | 5.0000 |
| 5.8134 | −6.6421 | 5.0000 |
| 5.6844 | −6.7874 | 5.0000 |
| 5.5426 | −6.9203 | 5.0000 |
| 5.3882 | −7.0382 | 5.0000 |
| 5.2206 | −7.1364 | 5.0000 |
| 3.6672 | −3.8637 | 5.0000 |
| 3.5697 | −3.6956 | 5.0000 |
| 3.9172 | −4.3902 | 5.0000 |
| 3.8413 | −4.2112 | 5.0000 |
| 3.7578 | −4.0356 | 5.0000 |
| 5.0050 | −2.4874 | 4.0000 |
| 5.1536 | −2.6059 | 4.0000 |
| 5.2978 | −2.7296 | 4.0000 |
| 5.4370 | −2.8589 | 4.0000 |
| 5.5705 | −2.9941 | 4.0000 |
| 5.6977 | −3.1353 | 4.0000 |
| −0.8086 | −0.1276 | 4.0000 |
| −0.7252 | −0.0041 | 4.0000 |
| −0.8246 | −0.0982 | 4.0000 |
| −0.5452 | −0.0653 | 4.0000 |
| −0.8267 | −0.0649 | 4.0000 |
| −0.8145 | −0.0338 | 4.0000 |
| −0.7901 | −0.0108 | 4.0000 |
| −0.7584 | −0.0004 | 4.0000 |
| −0.7819 | −0.1477 | 4.0000 |
| 1.6088 | −0.8134 | 4.0000 |
| 1.7872 | −0.8791 | 4.0000 |
| 1.9651 | −0.9457 | 4.0000 |
| 2.1427 | −1.0134 | 4.0000 |
| 2.3198 | −1.0822 | 4.0000 |
| 1.0610 | −1.1310 | 4.0000 |
| 0.8994 | −1.0309 | 4.0000 |
| −0.3653 | −0.1264 | 4.0000 |
| 0.7365 | −0.9332 | 4.0000 |
| −0.1854 | −0.1876 | 4.0000 |
| 0.5722 | −0.8377 | 4.0000 |
| −0.0055 | −0.2488 | 4.0000 |
| 0.4066 | −0.7445 | 4.0000 |
| 0.1743 | −0.3102 | 4.0000 |
| 0.2398 | −0.6534 | 4.0000 |

TABLE I-continued

| X Coordinate | Y Coordinate | Z Coordinate |
|---|---|---|
| 0.3541 | −0.3718 | 4.0000 |
| 0.0719 | −0.5644 | 4.0000 |
| 0.5338 | −0.4336 | 4.0000 |
| −0.0971 | −0.4774 | 4.0000 |
| 0.7134 | −0.4957 | 4.0000 |
| −0.2670 | −0.3923 | 4.0000 |
| 0.8929 | −0.5581 | 4.0000 |
| −0.4378 | −0.3091 | 4.0000 |
| 1.0722 | −0.6210 | 4.0000 |
| −0.6095 | −0.2276 | 4.0000 |
| 1.2513 | −0.6845 | 4.0000 |
| 1.4302 | −0.7486 | 4.0000 |
| 2.2907 | −2.0228 | 4.0000 |
| 2.1441 | −1.9018 | 4.0000 |
| 1.9953 | −1.7837 | 4.0000 |
| 1.8443 | −1.6683 | 4.0000 |
| 1.6912 | −1.5557 | 4.0000 |
| 1.5362 | −1.4457 | 4.0000 |
| 2.4964 | −1.1524 | 4.0000 |
| 1.3795 | −1.3383 | 4.0000 |
| 2.6724 | −1.2240 | 4.0000 |
| 1.2210 | −1.2334 | 4.0000 |
| 2.8478 | −1.2973 | 4.0000 |
| 3.0223 | −1.3724 | 4.0000 |
| 3.1960 | −1.4494 | 4.0000 |
| 3.3688 | −1.5286 | 4.0000 |
| 3.5405 | −1.6100 | 4.0000 |
| 3.7110 | −1.6939 | 4.0000 |
| 3.8801 | −1.7806 | 4.0000 |
| 4.0476 | −1.8703 | 4.0000 |
| 4.2133 | −1.9633 | 4.0000 |
| 4.3770 | −2.0599 | 4.0000 |
| 2.5761 | −2.2737 | 4.0000 |
| 2.4347 | −2.1467 | 4.0000 |
| 3.5756 | −3.4145 | 4.0000 |
| 3.4667 | −3.2588 | 4.0000 |
| 3.3523 | −3.1071 | 4.0000 |
| 3.2330 | −2.9592 | 4.0000 |
| 3.1092 | −2.8150 | 4.0000 |
| 2.9813 | −2.6745 | 4.0000 |
| 2.8496 | −2.5375 | 4.0000 |
| 2.7144 | −2.4040 | 4.0000 |
| 4.5382 | −2.1604 | 4.0000 |
| 4.6969 | −2.2650 | 4.0000 |
| 4.8526 | −2.3739 | 4.0000 |
| 6.1430 | −5.9552 | 4.0000 |
| 6.1238 | −3.7627 | 4.0000 |
| 6.2047 | −3.9346 | 4.0000 |
| 6.2733 | −4.1118 | 4.0000 |
| 6.3283 | −4.2936 | 4.0000 |
| 6.3690 | −4.4792 | 4.0000 |
| 6.3946 | −4.6674 | 4.0000 |
| 6.4047 | −4.8571 | 4.0000 |
| 6.3991 | −5.0470 | 4.0000 |
| 6.3778 | −5.2358 | 4.0000 |
| 6.3412 | −5.4222 | 4.0000 |
| 6.2896 | −5.6050 | 4.0000 |
| 6.2233 | −5.7831 | 4.0000 |
| 6.0492 | −6.1205 | 4.0000 |
| 5.9425 | −6.2777 | 4.0000 |
| 4.2600 | −5.1692 | 4.0000 |
| 4.2289 | −4.9818 | 4.0000 |
| 4.1898 | −4.7958 | 4.0000 |
| 4.1421 | −4.6119 | 4.0000 |
| 4.0856 | −4.4305 | 4.0000 |
| 4.0204 | −4.2520 | 4.0000 |
| 5.8175 | −3.2828 | 4.0000 |
| 3.9466 | −4.0769 | 4.0000 |
| 5.9291 | −3.4366 | 4.0000 |
| 3.8647 | −3.9055 | 4.0000 |
| 6.0315 | −3.5966 | 4.0000 |
| 3.7751 | −3.7379 | 4.0000 |
| 3.6786 | −3.5742 | 4.0000 |
| 4.3369 | −6.1159 | 4.0000 |
| 4.3255 | −5.9263 | 4.0000 |
| 4.3145 | −5.7365 | 4.0000 |
| 4.3013 | −5.5470 | 4.0000 |
| 4.2838 | −5.3578 | 4.0000 |

TABLE I-continued

| X Coordinate | Y Coordinate | Z Coordinate |
|---|---|---|
| 5.8235 | −6.4258 | 4.0000 |
| 5.6927 | −6.5635 | 4.0000 |
| 5.5505 | −6.6895 | 4.0000 |
| 5.3971 | −6.8015 | 4.0000 |
| 5.2326 | −6.8964 | 4.0000 |
| 5.0561 | −6.9663 | 4.0000 |
| 4.8692 | −6.9970 | 4.0000 |
| 4.6889 | −6.9476 | 4.0000 |
| 4.5371 | −6.8354 | 4.0000 |
| 4.4376 | −6.6746 | 4.0000 |
| 4.3828 | −6.4929 | 4.0000 |
| 4.3533 | −6.3052 | 4.0000 |
| 0.3979 | −0.6331 | 3.0000 |
| 0.5056 | −0.3620 | 3.0000 |
| 0.6814 | −0.4221 | 3.0000 |
| 0.8571 | −0.4825 | 3.0000 |
| 1.0327 | −0.5432 | 3.0000 |
| 1.2081 | −0.6043 | 3.0000 |
| 1.3834 | −0.6659 | 3.0000 |
| 1.5585 | −0.7281 | 3.0000 |
| 1.7333 | −0.7909 | 3.0000 |
| 1.9078 | −0.8546 | 3.0000 |
| 2.0820 | −0.9191 | 3.0000 |
| 2.2559 | −0.9846 | 3.0000 |
| 1.2052 | −1.0922 | 3.0000 |
| 1.0463 | −0.9959 | 3.0000 |
| 0.8861 | −0.9019 | 3.0000 |
| 0.7246 | −0.8101 | 3.0000 |
| 0.5618 | −0.7205 | 3.0000 |
| −0.5500 | −0.0042 | 3.0000 |
| −0.6392 | −0.0340 | 3.0000 |
| −0.6150 | −0.0109 | 3.0000 |
| −0.5833 | −0.0005 | 3.0000 |
| 0.3298 | −0.3021 | 3.0000 |
| 0.2329 | −0.5477 | 3.0000 |
| 0.0669 | −0.4642 | 3.0000 |
| −0.0999 | −0.3826 | 3.0000 |
| −0.2677 | −0.3027 | 3.0000 |
| −0.4361 | −0.2244 | 3.0000 |
| −0.6053 | −0.1475 | 3.0000 |
| −0.6322 | −0.1277 | 3.0000 |
| −0.6485 | −0.0985 | 3.0000 |
| −0.3741 | −0.0637 | 3.0000 |
| −0.6511 | −0.0652 | 3.0000 |
| −0.1981 | −0.1232 | 3.0000 |
| −0.0221 | −0.1827 | 3.0000 |
| 0.1539 | −0.2423 | 3.0000 |
| 3.7926 | −1.6420 | 3.0000 |
| 3.9584 | −1.7256 | 3.0000 |
| 4.1229 | −1.8121 | 3.0000 |
| 4.2856 | −1.9017 | 3.0000 |
| 4.4465 | −1.9946 | 3.0000 |
| 2.6970 | −2.1952 | 3.0000 |
| 2.5576 | −2.0724 | 3.0000 |
| 2.4156 | −1.9527 | 3.0000 |
| 2.2712 | −1.8358 | 3.0000 |
| 2.1245 | −1.7217 | 3.0000 |
| 1.9759 | −1.6103 | 3.0000 |
| 1.8252 | −1.5016 | 3.0000 |
| 2.4293 | −1.0512 | 3.0000 |
| 1.6727 | −1.3955 | 3.0000 |
| 2.6023 | −1.1190 | 3.0000 |
| 1.5185 | −1.2920 | 3.0000 |
| 2.7747 | −1.1882 | 3.0000 |
| 1.3626 | −1.1909 | 3.0000 |
| 2.9464 | −1.2590 | 3.0000 |
| 3.1175 | −1.3315 | 3.0000 |
| 3.2877 | −1.4059 | 3.0000 |
| 3.4571 | −1.4823 | 3.0000 |
| 3.6254 | −1.5610 | 3.0000 |
| 3.4644 | −3.0019 | 3.0000 |
| 3.3463 | −2.8586 | 3.0000 |
| 3.2237 | −2.7190 | 3.0000 |
| 3.0972 | −2.5830 | 3.0000 |
| 2.9670 | −2.4504 | 3.0000 |
| 2.8335 | −2.3212 | 3.0000 |
| 4.6052 | −2.0912 | 3.0000 |
| 4.7614 | −2.1916 | 3.0000 |

TABLE I-continued

| X Coordinate | Y Coordinate | Z Coordinate |
|---|---|---|
| 4.9149 | −2.2963 | 3.0000 |
| 5.0652 | −2.4055 | 3.0000 |
| 5.2120 | −2.5194 | 3.0000 |
| 5.3545 | −2.6385 | 3.0000 |
| 5.4924 | −2.7630 | 3.0000 |
| 5.6248 | −2.8933 | 3.0000 |
| 5.7512 | −3.0294 | 3.0000 |
| 5.8705 | −3.1718 | 3.0000 |
| 3.6855 | −3.3004 | 3.0000 |
| 3.5777 | −3.1492 | 3.0000 |
| 6.3795 | −4.1544 | 3.0000 |
| 6.4188 | −4.3359 | 3.0000 |
| 6.4424 | −4.5201 | 3.0000 |
| 6.4498 | −4.7057 | 3.0000 |
| 4.3640 | −5.9466 | 3.0000 |
| 6.4409 | −4.8912 | 3.0000 |
| 4.3637 | −5.7608 | 3.0000 |
| 6.4157 | −5.0752 | 3.0000 |
| 4.3638 | −5.5750 | 3.0000 |
| 6.3744 | −5.2562 | 3.0000 |
| 4.3610 | −5.3893 | 3.0000 |
| 6.3179 | −5.4331 | 3.0000 |
| 4.3530 | −5.2037 | 3.0000 |
| 6.2467 | −5.6047 | 3.0000 |
| 4.3377 | −5.0185 | 3.0000 |
| 6.1618 | −5.7699 | 3.0000 |
| 4.3137 | −4.8343 | 3.0000 |
| 6.0639 | −5.9277 | 3.0000 |
| 4.2805 | −4.6516 | 3.0000 |
| 4.2376 | −4.4708 | 3.0000 |
| 4.1849 | −4.2927 | 3.0000 |
| 4.1226 | −4.1177 | 3.0000 |
| 4.0511 | −3.9463 | 3.0000 |
| 5.9819 | −3.3204 | 3.0000 |
| 3.9709 | −3.7787 | 3.0000 |
| 6.0844 | −3.4754 | 3.0000 |
| 3.8827 | −3.6152 | 3.0000 |
| 6.1766 | −3.6366 | 3.0000 |
| 3.7874 | −3.4558 | 3.0000 |
| 6.2573 | −3.8039 | 3.0000 |
| 6.3253 | −3.9767 | 3.0000 |
| 4.4464 | −6.4939 | 3.0000 |
| 4.3926 | −6.3165 | 3.0000 |
| 4.3704 | −6.1322 | 3.0000 |
| 5.9539 | −6.0774 | 3.0000 |
| 5.8325 | −6.2179 | 3.0000 |
| 5.7003 | −6.3484 | 3.0000 |
| 5.5579 | −6.4676 | 3.0000 |
| 5.4055 | −6.5738 | 3.0000 |
| 5.2432 | −6.6640 | 3.0000 |
| 5.0709 | −6.7330 | 3.0000 |
| 4.8892 | −6.7698 | 3.0000 |
| 4.7065 | −6.7467 | 3.0000 |
| 4.5518 | −6.6456 | 3.0000 |
| −0.4562 | −0.1278 | 2.0000 |
| −0.4728 | −0.0988 | 2.0000 |
| −0.3750 | −0.0042 | 2.0000 |
| −0.4757 | −0.0655 | 2.0000 |
| −0.2030 | −0.0621 | 2.0000 |
| 1.1927 | −0.9612 | 2.0000 |
| −0.4641 | −0.0342 | 2.0000 |
| −0.0309 | −0.1201 | 2.0000 |
| 1.0353 | −0.8708 | 2.0000 |
| −0.4400 | −0.0110 | 2.0000 |
| 0.1411 | −0.1781 | 2.0000 |
| 0.8766 | −0.7827 | 2.0000 |
| −0.4083 | −0.0005 | 2.0000 |
| 0.3131 | −0.2362 | 2.0000 |
| 0.7167 | −0.6967 | 2.0000 |
| 0.4851 | −0.2944 | 2.0000 |
| 0.5556 | −0.6128 | 2.0000 |
| 0.6570 | −0.3528 | 2.0000 |
| 0.3935 | −0.5310 | 2.0000 |
| 0.8288 | −0.4114 | 2.0000 |
| 0.2305 | −0.4511 | 2.0000 |
| 1.0006 | −0.4702 | 2.0000 |
| 0.0666 | −0.3730 | 2.0000 |
| 1.1723 | −0.5294 | 2.0000 |

TABLE I-continued

| X Coordinate | Y Coordinate | Z Coordinate |
|---|---|---|
| −0.0980 | −0.2964 | 2.0000 |
| 1.3438 | −0.5888 | 2.0000 |
| −0.2632 | −0.2213 | 2.0000 |
| 1.5152 | −0.6488 | 2.0000 |
| −0.4291 | −0.1474 | 2.0000 |
| 1.6864 | −0.7093 | 2.0000 |
| 1.8573 | −0.7704 | 2.0000 |
| 2.0280 | −0.8322 | 2.0000 |
| 2.1984 | −0.8948 | 2.0000 |
| 3.3786 | −1.3658 | 2.0000 |
| 3.5445 | −1.4396 | 2.0000 |
| 3.7095 | −1.5154 | 2.0000 |
| 3.8734 | −1.5935 | 2.0000 |
| 4.0361 | −1.6741 | 2.0000 |
| 4.1974 | −1.7573 | 2.0000 |
| 4.3572 | −1.8435 | 2.0000 |
| 4.5152 | −1.9329 | 2.0000 |
| 5.6776 | −2.7971 | 2.0000 |
| 5.8030 | −2.9284 | 2.0000 |
| 5.9215 | −3.0658 | 2.0000 |
| 3.7892 | −3.1931 | 2.0000 |
| 3.6829 | −3.0459 | 2.0000 |
| 3.5713 | −2.9028 | 2.0000 |
| 3.4547 | −2.7636 | 2.0000 |
| 3.3338 | −2.6281 | 2.0000 |
| 3.2091 | −2.4962 | 2.0000 |
| 4.6713 | −2.0257 | 2.0000 |
| 4.8250 | −2.1223 | 2.0000 |
| 4.9761 | −2.2229 | 2.0000 |
| 5.1243 | −2.3278 | 2.0000 |
| 5.2691 | −2.4373 | 2.0000 |
| 5.4099 | −2.5519 | 2.0000 |
| 5.5463 | −2.6717 | 2.0000 |
| 1.9581 | −1.4490 | 2.0000 |
| 2.5382 | −1.0229 | 2.0000 |
| 1.8082 | −1.3465 | 2.0000 |
| 2.7075 | −1.0886 | 2.0000 |
| 1.6566 | −1.2465 | 2.0000 |
| 2.8762 | −1.1555 | 2.0000 |
| 1.5035 | −1.1490 | 2.0000 |
| 3.0444 | −1.2240 | 2.0000 |
| 1.3488 | −1.0540 | 2.0000 |
| 3.2119 | −1.2940 | 2.0000 |
| 2.8151 | −2.1203 | 2.0000 |
| 2.6780 | −2.0013 | 2.0000 |
| 2.5383 | −1.8853 | 2.0000 |
| 2.3964 | −1.7722 | 2.0000 |
| 2.2522 | −1.6618 | 2.0000 |
| 2.1061 | −1.5540 | 2.0000 |
| 2.3685 | −0.9584 | 2.0000 |
| 3.0809 | −2.3677 | 2.0000 |
| 2.9495 | −2.2424 | 2.0000 |
| 4.2761 | −4.1629 | 2.0000 |
| 4.2169 | −3.9913 | 2.0000 |
| 4.1478 | −3.8234 | 2.0000 |
| 6.0322 | −3.2097 | 2.0000 |
| 4.0696 | −3.6596 | 2.0000 |
| 6.1339 | −3.3601 | 2.0000 |
| 3.9832 | −3.4999 | 2.0000 |
| 6.2254 | −3.5168 | 2.0000 |
| 3.8895 | −3.3445 | 2.0000 |
| 6.3055 | −3.6797 | 2.0000 |
| 6.3726 | −3.8484 | 2.0000 |
| 6.4253 | −4.0221 | 2.0000 |
| 6.4625 | −4.1997 | 2.0000 |
| 6.4833 | −4.3800 | 2.0000 |
| 4.3784 | −5.9636 | 2.0000 |
| 6.4873 | −4.5614 | 2.0000 |
| 4.3817 | −5.7822 | 2.0000 |
| 6.4741 | −4.7424 | 2.0000 |
| 4.3925 | −5.6009 | 2.0000 |
| 6.4441 | −4.9214 | 2.0000 |
| 4.4040 | −5.4197 | 2.0000 |
| 6.3981 | −5.0970 | 2.0000 |
| 4.4119 | −5.2384 | 2.0000 |
| 6.3368 | −5.2678 | 2.0000 |
| 4.4137 | −5.0568 | 2.0000 |
| 6.2612 | −5.4328 | 2.0000 |

TABLE I-continued

| X Coordinate | Y Coordinate | Z Coordinate |
|---|---|---|
| 4.4070 | −4.8754 | 2.0000 |
| 6.1721 | −5.5910 | 2.0000 |
| 4.3903 | −4.6947 | 2.0000 |
| 6.0706 | −5.7415 | 2.0000 |
| 4.3631 | −4.5152 | 2.0000 |
| 4.3250 | −4.3377 | 2.0000 |
| 5.7018 | −6.1406 | 2.0000 |
| 5.5597 | −6.2537 | 2.0000 |
| 5.4088 | −6.3545 | 2.0000 |
| 5.2491 | −6.4406 | 2.0000 |
| 5.0805 | −6.5077 | 2.0000 |
| 4.9036 | −6.5473 | 2.0000 |
| 4.7231 | −6.5399 | 2.0000 |
| 4.5634 | −6.4568 | 2.0000 |
| 4.4504 | −6.3164 | 2.0000 |
| 4.3949 | −6.1443 | 2.0000 |
| 5.9579 | −5.8837 | 2.0000 |
| 5.8347 | −6.0170 | 2.0000 |
| 1.3093 | −0.5177 | 1.0000 |
| 0.0704 | −0.2908 | 1.0000 |
| 1.4766 | −0.5758 | 1.0000 |
| −0.0914 | −0.2186 | 1.0000 |
| 1.6438 | −0.6344 | 1.0000 |
| −0.2536 | −0.1475 | 1.0000 |
| 1.8109 | −0.6935 | 1.0000 |
| 1.9777 | −0.7531 | 1.0000 |
| 2.1443 | −0.8134 | 1.0000 |
| −0.2809 | −0.1280 | 1.0000 |
| −0.2977 | −0.0990 | 1.0000 |
| −0.2002 | −0.0042 | 1.0000 |
| −0.3007 | −0.0657 | 1.0000 |
| −0.0323 | −0.0607 | 1.0000 |
| 1.3355 | −0.9284 | 1.0000 |
| −0.2892 | −0.0343 | 1.0000 |
| 0.1356 | −0.1173 | 1.0000 |
| 1.1812 | −0.8414 | 1.0000 |
| −0.2652 | −0.0111 | 1.0000 |
| 0.3034 | −0.1740 | 1.0000 |
| 1.0256 | −0.7566 | 1.0000 |
| −0.2334 | −0.0005 | 1.0000 |
| 0.4712 | −0.2308 | 1.0000 |
| 0.8688 | −0.6741 | 1.0000 |
| 0.6390 | −0.2878 | 1.0000 |
| 0.7110 | −0.5937 | 1.0000 |
| 0.8067 | −0.3449 | 1.0000 |
| 0.5521 | −0.5154 | 1.0000 |
| 0.9743 | −0.4023 | 1.0000 |
| 0.3923 | −0.4389 | 1.0000 |
| 1.1419 | −0.4598 | 1.0000 |
| 0.2317 | −0.3641 | 1.0000 |
| 5.3180 | −2.3596 | 1.0000 |
| 5.4568 | −2.4696 | 1.0000 |
| 5.5913 | −2.5848 | 1.0000 |
| 5.7209 | −2.7056 | 1.0000 |
| 5.8447 | −2.8323 | 1.0000 |
| 5.9618 | −2.9653 | 1.0000 |
| 2.7905 | −1.9350 | 1.0000 |
| 2.6537 | −1.8224 | 1.0000 |
| 2.5147 | −1.7126 | 1.0000 |
| 2.3735 | −1.6055 | 1.0000 |
| 2.3106 | −0.8744 | 1.0000 |
| 2.2304 | −1.5011 | 1.0000 |
| 2.4766 | −0.9362 | 1.0000 |
| 2.0854 | −1.3994 | 1.0000 |
| 2.6423 | −0.9989 | 1.0000 |
| 1.9386 | −1.3002 | 1.0000 |
| 2.8076 | −1.0626 | 1.0000 |
| 1.7901 | −1.2036 | 1.0000 |
| 2.9724 | −1.1275 | 1.0000 |
| 1.6401 | −1.1094 | 1.0000 |
| 3.1368 | −1.1937 | 1.0000 |
| 1.4885 | −1.0177 | 1.0000 |
| 3.3005 | −1.2614 | 1.0000 |
| 3.4635 | −1.3308 | 1.0000 |
| 3.6258 | −1.4019 | 1.0000 |
| 3.7871 | −1.4750 | 1.0000 |
| 3.9476 | −1.5501 | 1.0000 |
| 4.1069 | −1.6275 | 1.0000 |

TABLE I-continued

| X Coordinate | Y Coordinate | Z Coordinate |
|---|---|---|
| 4.2650 | −1.7074 | 1.0000 |
| 4.4217 | −1.7902 | 1.0000 |
| 3.1851 | −2.2908 | 1.0000 |
| 4.5767 | −1.8759 | 1.0000 |
| 3.0564 | −2.1691 | 1.0000 |
| 4.7299 | −1.9648 | 1.0000 |
| 2.9248 | −2.0505 | 1.0000 |
| 4.8810 | −2.0574 | 1.0000 |
| 5.0296 | −2.1539 | 1.0000 |
| 5.1754 | −2.2545 | 1.0000 |
| 3.8790 | −3.0939 | 1.0000 |
| 3.7748 | −2.9507 | 1.0000 |
| 3.6653 | −2.8114 | 1.0000 |
| 3.5511 | −2.6759 | 1.0000 |
| 3.4328 | −2.5441 | 1.0000 |
| 3.3106 | −2.4158 | 1.0000 |
| 6.4848 | −4.6009 | 1.0000 |
| 4.4095 | −5.4438 | 1.0000 |
| 6.4499 | −4.7745 | 1.0000 |
| 4.4324 | −5.2681 | 1.0000 |
| 6.3991 | −4.9442 | 1.0000 |
| 4.4509 | −5.0919 | 1.0000 |
| 6.3336 | −5.1087 | 1.0000 |
| 4.4623 | −4.9151 | 1.0000 |
| 6.2543 | −5.2670 | 1.0000 |
| 4.4640 | −4.7380 | 1.0000 |
| 6.1623 | −5.4184 | 1.0000 |
| 4.4541 | −4.5612 | 1.0000 |
| 6.0587 | −5.5621 | 1.0000 |
| 4.4323 | −4.3854 | 1.0000 |
| 5.9447 | −5.6976 | 1.0000 |
| 4.3985 | −4.2115 | 1.0000 |
| 4.3530 | −4.0404 | 1.0000 |
| 4.2964 | −3.8725 | 1.0000 |
| 4.2296 | −3.7084 | 1.0000 |
| 6.0710 | −3.1047 | 1.0000 |
| 4.1536 | −3.5485 | 1.0000 |
| 6.1712 | −3.2508 | 1.0000 |
| 4.0692 | −3.3927 | 1.0000 |
| 6.2609 | −3.4035 | 1.0000 |
| 3.9774 | −3.2412 | 1.0000 |
| 6.3389 | −3.5625 | 1.0000 |
| 6.4034 | −3.7275 | 1.0000 |
| 6.4531 | −3.8974 | 1.0000 |
| 6.4867 | −4.0713 | 1.0000 |
| 6.5034 | −4.2476 | 1.0000 |
| 4.3754 | −5.7962 | 1.0000 |
| 6.5028 | −4.4247 | 1.0000 |
| 4.3875 | −5.6196 | 1.0000 |
| 5.8210 | −5.8244 | 1.0000 |
| 5.6886 | −5.9420 | 1.0000 |
| 5.5479 | −6.0496 | 1.0000 |
| 5.3991 | −6.1457 | 1.0000 |
| 5.2424 | −6.2280 | 1.0000 |
| 5.0777 | −6.2930 | 1.0000 |
| 4.9054 | −6.3333 | 1.0000 |
| 4.7288 | −6.3338 | 1.0000 |
| 4.5664 | −6.2674 | 1.0000 |
| 4.4467 | −6.1387 | 1.0000 |
| 4.3874 | −5.9727 | 1.0000 |
| −0.1145 | −0.0344 | 0.0000 |
| 0.1382 | −0.0593 | 0.0000 |
| −0.1260 | −0.0659 | 0.0000 |
| 0.3019 | −0.1147 | 0.0000 |
| 1.3262 | −0.8119 | 0.0000 |
| −0.1229 | −0.0993 | 0.0000 |
| 0.4654 | −0.1702 | 0.0000 |
| 1.1738 | −0.7305 | 0.0000 |
| −0.1060 | −0.1282 | 0.0000 |
| 0.6290 | −0.2258 | 0.0000 |
| 1.0203 | −0.6514 | 0.0000 |
| 0.7924 | −0.2817 | 0.0000 |
| 0.8656 | −0.5745 | 0.0000 |
| 0.9558 | −0.3377 | 0.0000 |
| 0.7099 | −0.4997 | 0.0000 |
| 1.1191 | −0.3939 | 0.0000 |
| 0.5533 | −0.4268 | 0.0000 |
| 1.2824 | −0.4503 | 0.0000 |

TABLE I-continued

| X Coordinate | Y Coordinate | Z Coordinate |
|---|---|---|
| 0.3960 | −0.3554 | 0.0000 |
| 1.4455 | −0.5070 | 0.0000 |
| 0.2382 | −0.2853 | 0.0000 |
| 1.6086 | −0.5641 | 0.0000 |
| 0.0799 | −0.2161 | 0.0000 |
| 1.7715 | −0.6215 | 0.0000 |
| −0.0787 | −0.1477 | 0.0000 |
| 1.9343 | −0.6793 | 0.0000 |
| 2.0968 | −0.7376 | 0.0000 |
| −0.0587 | −0.0004 | 0.0000 |
| −0.0905 | −0.0111 | 0.0000 |
| −0.0254 | −0.0041 | 0.0000 |
| 1.6271 | −0.9816 | 0.0000 |
| 3.3870 | −1.2321 | 0.0000 |
| 1.4773 | −0.8955 | 0.0000 |
| 3.5463 | −1.2991 | 0.0000 |
| 3.7048 | −1.3677 | 0.0000 |
| 3.8625 | −1.4381 | 0.0000 |
| 4.0194 | −1.5104 | 0.0000 |
| 4.1753 | −1.5847 | 0.0000 |
| 4.3301 | −1.6614 | 0.0000 |
| 4.4835 | −1.7407 | 0.0000 |
| 2.8998 | −1.8711 | 0.0000 |
| 2.7663 | −1.7615 | 0.0000 |
| 2.6305 | −1.6547 | 0.0000 |
| 2.2592 | −0.7966 | 0.0000 |
| 2.4926 | −1.5507 | 0.0000 |
| 2.4213 | −0.8561 | 0.0000 |
| 2.3527 | −1.4494 | 0.0000 |
| 2.5832 | −0.9164 | 0.0000 |
| 2.2110 | −1.3507 | 0.0000 |
| 2.7448 | −0.9775 | 0.0000 |
| 2.0674 | −1.2546 | 0.0000 |
| 2.9060 | −1.0394 | 0.0000 |
| 1.9222 | −1.1611 | 0.0000 |
| 3.0669 | −1.1024 | 0.0000 |
| 1.7754 | −1.0701 | 0.0000 |
| 3.2272 | −1.1666 | 0.0000 |
| 3.9619 | −3.0002 | 0.0000 |
| 3.8602 | −2.8606 | 0.0000 |
| 3.7534 | −2.7249 | 0.0000 |
| 3.6421 | −2.5929 | 0.0000 |
| 3.5266 | −2.4644 | 0.0000 |
| 3.4074 | −2.3394 | 0.0000 |
| 3.2849 | −2.2176 | 0.0000 |
| 4.6355 | −1.8228 | 0.0000 |
| 3.1593 | −2.0990 | 0.0000 |
| 4.7858 | −1.9080 | 0.0000 |
| 3.0309 | −1.9835 | 0.0000 |
| 4.9340 | −1.9966 | 0.0000 |
| 5.0800 | −2.0890 | 0.0000 |
| 5.2233 | −2.1853 | 0.0000 |
| 5.3636 | −2.2861 | 0.0000 |
| 5.5003 | −2.3917 | 0.0000 |
| 5.6328 | −2.5025 | 0.0000 |
| 5.7604 | −2.6189 | 0.0000 |
| 5.8823 | −2.7412 | 0.0000 |
| 5.9976 | −2.8699 | 0.0000 |
| 6.2028 | −3.1474 | 0.0000 |
| 4.1473 | −3.2916 | 0.0000 |
| 6.2902 | −3.2964 | 0.0000 |
| 4.0579 | −3.1439 | 0.0000 |
| 6.3652 | −3.4519 | 0.0000 |
| 6.4262 | −3.6134 | 0.0000 |
| 6.4718 | −3.7799 | 0.0000 |
| 6.5007 | −3.9502 | 0.0000 |
| 4.3728 | −5.8022 | 0.0000 |
| 6.5121 | −4.1225 | 0.0000 |
| 4.3633 | −5.6301 | 0.0000 |
| 6.5057 | −4.2950 | 0.0000 |
| 4.3837 | −5.4587 | 0.0000 |
| 6.4819 | −4.4660 | 0.0000 |
| 4.4167 | −5.2892 | 0.0000 |
| 6.4414 | −4.6339 | 0.0000 |
| 4.4512 | −5.1199 | 0.0000 |
| 6.3855 | −4.7972 | 0.0000 |
| 4.4813 | −4.9498 | 0.0000 |
| 6.3154 | −4.9550 | 0.0000 |

TABLE I-continued

| X Coordinate | Y Coordinate | Z Coordinate |
|---|---|---|
| 4.5027 | −4.7785 | 0.0000 |
| 6.2326 | −5.1066 | 0.0000 |
| 4.5128 | −4.6061 | 0.0000 |
| 6.1382 | −5.2512 | 0.0000 |
| 4.5098 | −4.4334 | 0.0000 |
| 6.0333 | −5.3883 | 0.0000 |
| 4.4935 | −4.2615 | 0.0000 |
| 5.9187 | −5.5176 | 0.0000 |
| 4.4640 | −4.0913 | 0.0000 |
| 5.7955 | −5.6386 | 0.0000 |
| 4.4218 | −3.9239 | 0.0000 |
| 4.3678 | −3.7599 | 0.0000 |
| 4.3033 | −3.5996 | 0.0000 |
| 6.1048 | −3.0052 | 0.0000 |
| 4.2295 | −3.4435 | 0.0000 |
| 5.0653 | −6.0878 | 0.0000 |
| 4.8975 | −6.1278 | 0.0000 |
| 4.7253 | −6.1325 | 0.0000 |
| 4.5627 | −6.0787 | 0.0000 |
| 4.4378 | −5.9609 | 0.0000 |
| 5.6644 | −5.7510 | 0.0000 |
| 5.5257 | −5.8538 | 0.0000 |
| 5.3796 | −5.9460 | 0.0000 |
| 5.2261 | −6.0250 | 0.0000 |

It will also be appreciated that the airfoil disclosed in the above Table may be scaled up or down geometrically for use in other similar turbine designs. Consequently, the coordinate values set forth in Table I may be scaled upwardly or downwardly such that the airfoil section shape remains unchanged. A scaled version of the coordinates in Table I would be represented by X, Y and Z coordinate values multiplied or divided by the same constant or number.

Figure 3:
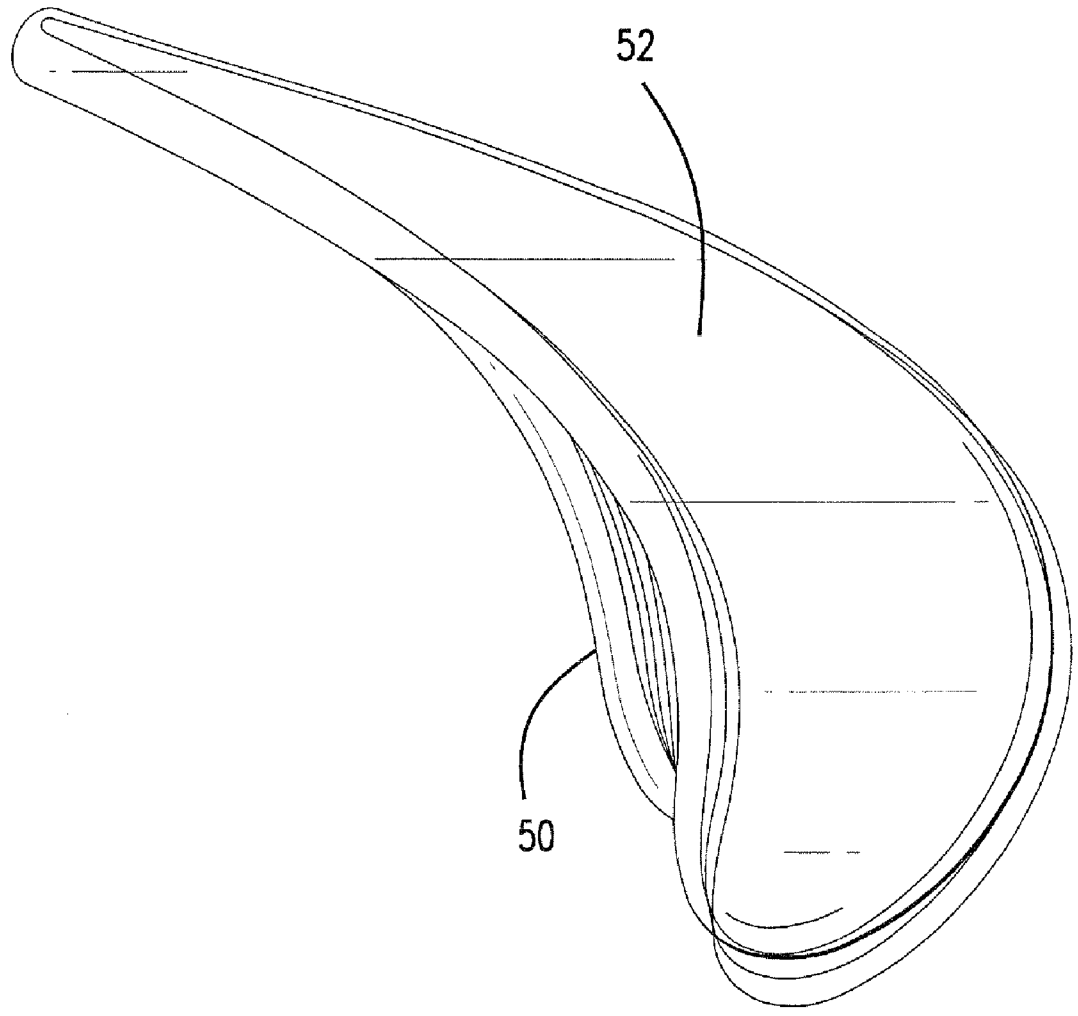
FIG. 3 is an end view of the nozzle vane illustrated in FIG. 2.
Figure 4:
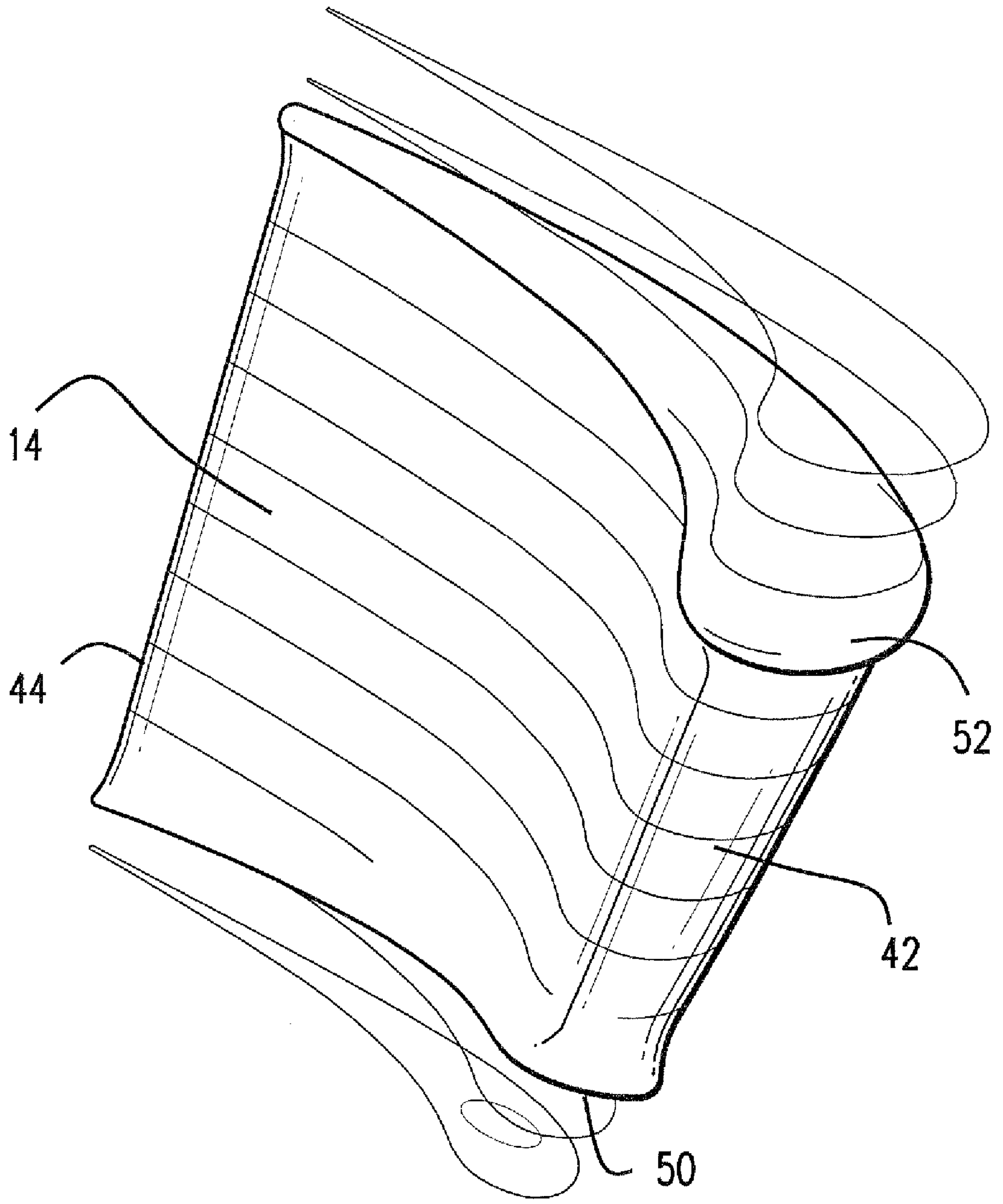
FIG. 4 is a perspective view thereof similar to FIG. 1.
Figure 5:
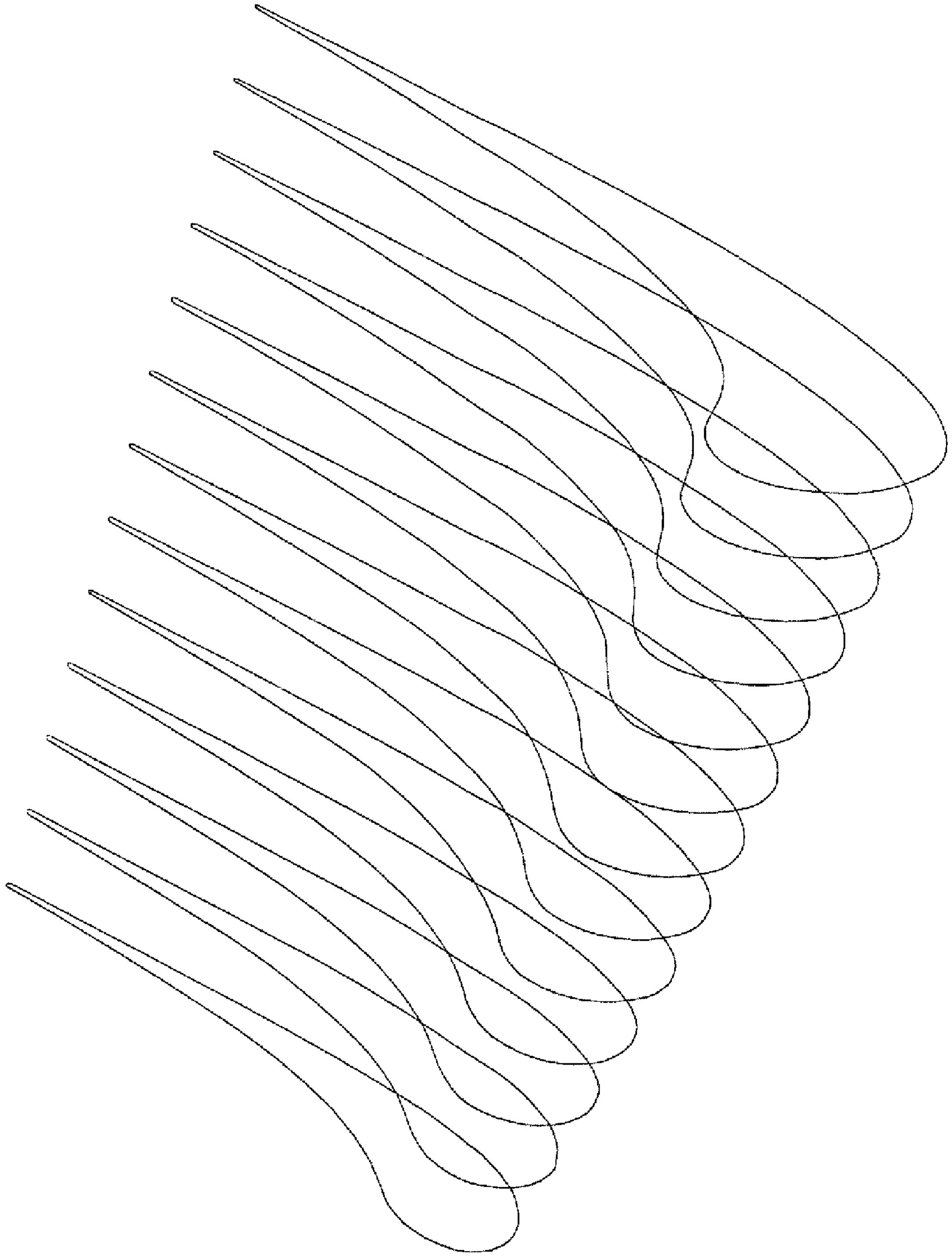
FIG. 5 is a perspective view of the nozzle vane of FIG. 4 illustrating various airfoil profiles along the length of the vane.
Figure 6:
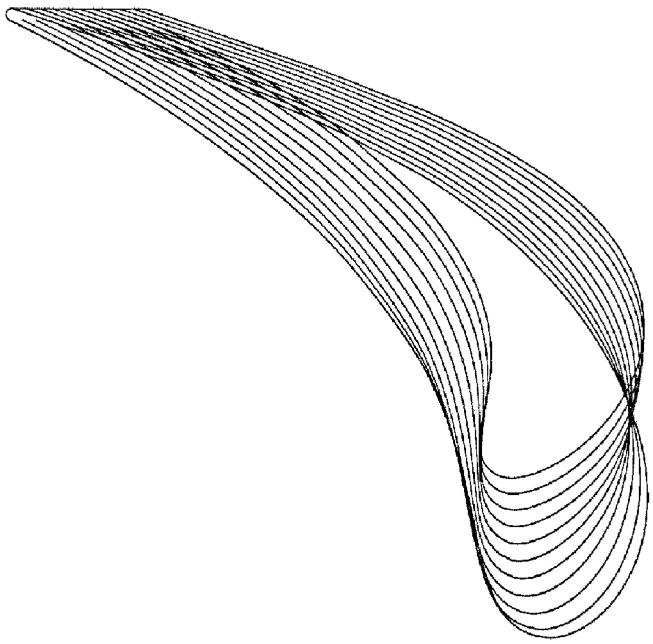
FIGS. 6 and 7 are views similar to FIG. 3 illustrating the profile sections at various Z coordinate locations along the vane.
Figure 7:
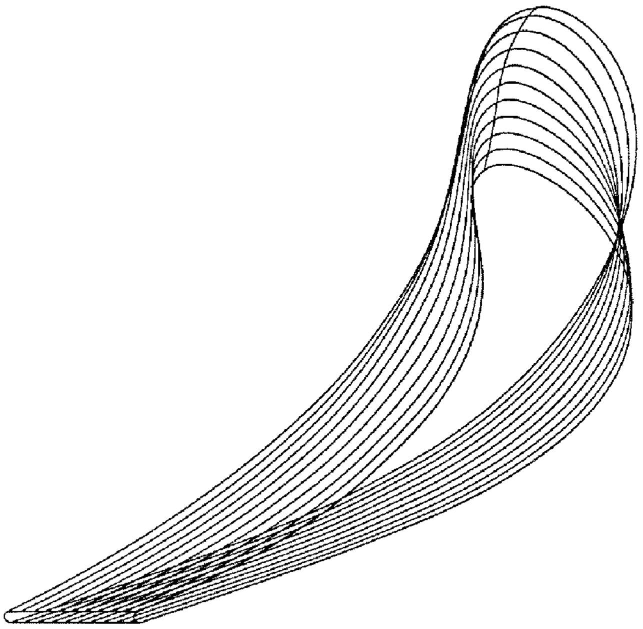

In FIGS. 3 and 4, the radially outermost profile 52 is illustrated with various other profile sections illustrated in FIG. 4 along the length of the airfoil. The various profiles are also illustrated in FIGS. 6 and 7 with the profiles being superposed one over the other.

The turbine vane airfoil profile for a turbine stage, for example the second stage, may be defined by a unique loci of points to achieve the necessary efficiency in loading requirements whereby improved turbine performance is obtained. It will be appreciated that the nominal profile given by the X, Y, Z coordinates of Table I define this unique loci of points. The coordinates given in inches in Table I are for a cold, i.e., room-temperature profile for each cross-section of the nozzle vane. Each defined cross-section is joined smoothly with adjacent cross-sections to form the complete airfoil shape. It will also be appreciated that as the nozzle heats up in use, the profile of the nozzle vane will change as a result of stress and temperature. Thus, the cold or room-temperature profile is given by the X, Y and Z coordinates for manufacturing purposes. Because a manufactured vane airfoil profile may be different than the nominal airfoil profile given in the following table, a distance of ±0.100 inches from the nominal profile in a direction normal to any surface location along the nominal profile and which includes any coating, defines the profile envelope for this design. The design is robust to this variation without impairment of the mechanical and aerodynamic functions.

The airfoils impart kinetic energy to the airflow and therefore bring about a desired flow through the turbine. The airfoils turn the fluid flow, accelerate the fluid flow velocity (in the respective airfoil frame of reference), and yield a decrease in the static pressure of the fluid flow. The configuration of the airfoil (along with its interaction with surrounding airfoils), as embodied by the invention, including its peripheral surface provides for stage efficiency, enhanced aeromechanics, flow transition from stage to stage, reduced thermal stresses, enhanced interrelation of the stages to effectively pass the airflow from stage to stage, and reduced mechanical stresses, among other desirable aspects of the invention. Typically, multiple rows of airfoil stages, such as, but not limited to, bucket/nozzle airfoils, are stacked to achieve a desired discharge to inlet pressure ratio. Airfoils can be secured to wheels or a case by an appropriate attachment configuration, often known as a "root", "base" or "dovetail" (see FIG. 1).

The configuration of the airfoil and any interaction with surrounding airfoils, as embodied by the invention, that provide the desirable aspects fluid flow dynamics of the invention can be determined by various means. Fluid flow from a preceding/upstream airfoil intersects with the airfoil, as embodied by the invention, and via the configuration of the instant airfoil, flow over and around the airfoil, as embodied by the invention, is enhanced. In particular, the fluid dynamics from the airfoil, as embodied by the invention, is enhanced. There is a smooth transition fluid flow from the preceding/upstream airfoil(s) and a smooth transition fluid flow to the adjacent/downstream airfoil(s). Moreover, the flow from the airfoil, as embodied by the invention, proceeds to the adjacent/downstream airfoil(s) as embodied by the invention. Therefore, the configuration of the airfoil, as embodied by the invention, assists in the prevention of turbulent fluid flow in the unit comprising the airfoil, as embodied by the invention.

For example, but in no way limiting of the invention, the airfoil configuration (with or without fluid flow interaction) can be determined by Computational Fluid Dynamics (CFD); traditional fluid dynamics analysis; Euler and Navier-Stokes equations; for transfer functions, algorithms, manufacturing: manual positioning, flow testing (for example in wind tunnels), and modification of the airfoil; in-situ testing; modeling: application of scientific principles to design or develop the airfoils, machines, apparatus, or manufacturing processes; airfoil flow testing and modification; combinations thereof, and other design processes and practices. These methods of determination are merely exemplary, and are not intended to limit the invention in any manner.

As noted above, the airfoil configuration (along with its interaction with surrounding airfoils), as embodied by the invention, including its peripheral surface provides for stage airflow efficiency, enhanced aeromechanics, smooth flow from stage to stage, reduced thermal stresses, enhanced interrelation of the stages to effectively pass the airflow from stage to stage, and reduced mechanical stresses, among other desirable aspects of the invention, compared to other similar airfoils, which have like applications. For example, and in no way limiting of the invention, the airfoil provided an increased efficiency compared to previous individual airfoils. Moreover, and in no way limiting of the invention, in conjunction with other airfoils, which are conventional or enhanced (similar to the enhancements herein), the airfoil, as embodied by the invention, provides an increased efficiency compared to previous individual sets of airfoils. This increased efficiency provides, in addition to the above-noted advantages, a power output with a decrease the required fuel, therefore inherently decreasing emissions to produce energy. Of course, other such advantages are within the scope of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine nozzle having a nozzle vane in the shape of an airfoil in an envelope within ±0.100 inches in a direction normal to any airfoil surface location wherein the airfoil has an uncoated nominal profile substantially in accordance with Cartesian coordinate values of X, Y and Z set forth in inches in Table I with the X, Y and Z values commencing at a radially innermost aerodynamic section of the airfoil and then made relative to that section for the Z coordinate values, the profiles at the Z distances being joined smoothly with one another to form the complete airfoil shape.

2. A turbine nozzle according to claim 1 forming part of a second stage of a turbine.

3. A turbine nozzle having a nozzle vane in the shape of an airfoil having an uncoated nominal airfoil profile substantially in accordance with Cartesian coordinate values of X, Y and Z set forth in inches in Table I with the X, Y and Z values commencing at a radially innermost aerodynamic section of the airfoil and then made relative to that section for the Z coordinate values, the profiles at the Z distances being joined smoothly with one another to form the complete airfoil profile; the X, Y and Z values being scaled as a function of the same constant or number to provide a scaled-up or scaled-down vane airfoil.

4. A turbine nozzle according to claim 3 forming part of a second stage of a turbine.

5. A turbine comprising a turbine nozzle having a plurality of vanes, each of said vanes being in the shape of an airfoil in an envelope within ±0.100 inches in a direction normal to any vane airfoil surface location wherein the airfoil has an uncoated nominal profile substantially in accordance with Cartesian coordinate values of X, Y and Z set forth in inches in Table I with the X, Y and Z values commencing at a radially innermost aerodynamic section of the airfoil and then made relative to that section for the Z coordinate values, the profiles at the Z distances being joined smoothly with one another to form the complete airfoil shape.

6. A turbine according to claim 5 wherein the turbine nozzle comprises a second stage of the turbine.

7. A turbine according to claim 5 wherein the turbine nozzle stage has forty-eight vanes.

8. A turbine comprising a turbine nozzle having a plurality of vanes, each of said vanes being in the shape of an airfoil having an uncoated nominal airfoil profile substantially in accordance with Cartesian coordinate values of X, Y and Z set forth in inches in Table I with the X, Y and Z values commencing at the radially innermost aerodynamic section of the airfoil and then made relative to that section for the Z coordinate values, the profiles at the Z distances being joined smoothly with one another to form the complete airfoil shape; the X, Y and Z values being scaled as a function of the same constant or number to provide a scaled-up or scaled-down vane airfoil.

9. A turbine according to claim 8 wherein the turbine nozzle comprises a second stage of the turbine.

10. A turbine according to claim 8 wherein the turbine nozzle stage has forty-eight vanes.

* * * * *